United States Patent
Chan et al.

(10) Patent No.: US 7,617,891 B2
(45) Date of Patent: Nov. 17, 2009

(54) MECHANICAL CRAWLER

(75) Inventors: Brian Chan, Millbrae, CA (US); Julio Guerrero, Cambridge, MA (US); Anette Hosoi, Cambridge, MA (US)

(73) Assignees: Schlumberger Technology Corporation, Ridgefield, CT (US); Massachusetts Institute of Technology, Cambridge, MA (US)

( * ) Notice: Subject to any disclaimer, the term of this patent is extended or adjusted under 35 U.S.C. 154(b) by 314 days.

(21) Appl. No.: 11/247,918

(22) Filed: Oct. 11, 2005

(65) Prior Publication Data

US 2007/0079997 A1 Apr. 12, 2007

(51) Int. Cl.
*B62D 57/02* (2006.01)
*E21B 43/00* (2006.01)

(52) U.S. Cl. .................. 180/7.1; 180/8.1; 180/8.5; 180/9; 180/21; 180/313; 166/66; 166/50; 166/55; 299/31; 305/60; 305/404

(58) Field of Classification Search .................. 180/7.1, 180/8.1, 8.5, 9, 21, 313; 166/66, 50, 55; 299/31; 305/60, 404

See application file for complete search history.

(56) References Cited

U.S. PATENT DOCUMENTS

| 3,066,637 | A | * | 12/1962 | Akutowicz | 440/12.65 |
| 3,623,566 | A | * | 11/1971 | Orloff | 180/7.1 |
| 4,345,658 | A | * | 8/1982 | Danel et al. | 180/8.5 |
| 5,005,658 | A | * | 4/1991 | Bares et al. | 180/8.1 |
| 5,788,002 | A | * | 8/1998 | Richter | 180/8.5 |
| 6,512,345 | B2 | * | 1/2003 | Borenstein et al. | 318/568.12 |
| 6,910,533 | B2 | | 6/2005 | Guerrero | 166/206 |
| 7,044,245 | B2 | * | 5/2006 | Anhalt et al. | 180/9.1 |
| 7,235,046 | B2 | * | 6/2007 | Anhalt et al. | 600/142 |

FOREIGN PATENT DOCUMENTS

WO 2005/008023 A1 1/2005

OTHER PUBLICATIONS

Abou, B., D. Bonn, and J. Meunier, "Nonlinear rheology of Laponite suspensions under an external drive." *J. Rheol.* 47 (2003): pp. 979-988.
"The Apple Snail Website." Jul. 27, 2006 http://www.applesnail.net/content/species/asolene_asolene_spixi.htm.
Ashmore, J., C. del Pino, and T. Mullin. "Cavitation in a Lubrication Flow between a Moving Sphere and a Boundary." *Physical Review Letters* 94 (2005): pp. 124501-1 to 124501-4.

(Continued)

*Primary Examiner*—Lesley D Morris
*Assistant Examiner*—Marlon A Arce
(74) *Attorney, Agent, or Firm*—Brigid Laffey; James McAleenan; Jody Lynn DeStefanis

(57) ABSTRACT

A self-propelled mechanical crawler adapted to move on a medium. One example of such a crawler includes a foot, a wave generator adapted to drive a periodic wave in the foot, and a wave transfer mechanism coupled between the wave generator and the foot. The wave transfer mechanism may be adapted to translate the periodic wave produced by the wave generator into a corresponding periodic deformation in the foot so as to generate forces in the medium to propel the crawler.

31 Claims, 14 Drawing Sheets

OTHER PUBLICATIONS

Balmforth, N.J. and R.V. Craster. "A consistent thin-layer theory for Bingham plastics." *J. Non-Newtonian Fluid Mech.* 84 (1999): pp. 65-81.

Cook, G. "MIT Scientists Copy the Snail's Pace." *The Boston Globe.* Jul. 3, 2003: A1.

Denny, M. "The role of gastropod pedal mucus in locomotion." *Nature* 285 (May 1980): pp. 160-161.

Denny, M.W. "A Quantitative Model for the Adhesive Locomotion of the Terrestrial Slug, *Ariolimax Columbianus*." *J.Exp.Biol.* 91(1981): pp. 195-217.

Hancock, G. J. "The self-propulsion of microscopic organisms through liquids." *Proceedings of the Royal Society of London, Series A., Mathematical and Physical Sciences* 217 (1953): pp. 96-121.

Itoh, et al. Film Structured Soft Actuator for Biomimetics of Snail's Gastropod Locomotion. *6th International Conference Control, Automation, Robotics and Vision ICARCV'2000* (2000).

Lissmann, H.W. "The Mechanism of Locomotion in Gastropod Molluscs." *J. Exp. Biol.* 21 (1945): pp. 58-69.

Lissmann, H.W. "The Mechanism of Locomotion in Gastropod Molluscs." *The Journal of Experimental Biology* 22 (1946): pp. 37-50.

Mahadevan et al. "Biomimetic Ratcheting Motion of a Soft, Slender, Sessile Gel." *PNAS* 101(1) (2004): pp. 23-26.

Moffett, S. "Locomotion in the Primitive Pulmonate Snail *Melampus Bidentatus*: Foot Structure and Function." *The Biological Bulletin* 157 (Oct. 1979): pp. 306-319.

Reynolds, O. "On the Theory of Lubrication and its Application to Mr. Beauchamp Tower's Experiments, including an Experimental Determination of the Viscosity of Olive Oil." *Philos. Trans. R. Soc. London, Ser. A* 177 (1886): pp. 157-235.

Skotheim, J.M. et al. "Soft Lubrication." Physical Review Letters vol. 92, No. 24 (Jun. 2004): pp. 245509-1 to 245509-4.

Taylor, G. "Analysis of the swimming of microscopic organisms." *Proceedings of the Royal Society of London, Series A, Mathematical and Physical Sciences* 209 (1951): pp. 447-461.

Vles, F. "Zoologie.—Sur les ondes pédieuses des Mollusques reptateurs." *C.R. Acad. Sci.*, Paris 145 (1907): pp. 276-278 (English translation of this article is attached to this article).

Willenbacher, N. "Unusual Thixotropic Properties of Aqueous Dispersions of Laponite RD." *Journal of Colloid and Interface Science* 182 (1996): pp. 501-510.

\* cited by examiner

MECHANICAL CRAWLER

STATEMENT REGARDING FEDERALLY SPONSORED RESEARCH OR DEVELOPMENT

This invention was made with government support awarded by the National Science Foundation under Grant Number DMS-0243591. The government has a certain rights in the invention.

BACKGROUND

1. Field of the Invention

The present invention pertains to a mechanical crawling device that may be capable of motion over diverse and complex topographies. In particular, this invention pertains to a mechanical crawler that moves via an out-of-plane wave driven in its foot.

2. Discussion Of Related Art

An active area of research in the field of robotics and mechanical engineering, is locomotion. There is an increasing need for machines that are capable of self-propelled motion in a variety of complex and challenging topographies.

For example, downhole tractors are used in the oil and gas industry to convey equipment, such as logging equipment, within a borehole. These downhole tractors are required to operate in the difficult environment of the borehole, and may be required to traverse a variety of soil/formation consistencies and boreholes of varying diameters and profiles. One example of a downhole tractor that may be used in boreholes is described in WO 2005/008023. This tractor uses a continuous track rotatably disposed about idler wheels, for locomotion, similar to tank tracks. The tractor also includes an actuator arm or link assembly (see U.S. Pat. No. 6,910,533, entitled "Mechanism that Assists Tractoring on Uniform and Non-Uniform Surfaces" issued to Schlumberger Technology Corporation on Jun. 28, 2005, incorporated by reference herein in its entirety) that can move the track assembly outward and inward to adapt to varying hole diameters.

Robotic design frequently looks to biology to gain insight into the mechanics of locomotion. In particular, adhesive locomotion, used by most marine and terrestrial gastropods (e.g., snails) is inspiring a new paradigm in robotics. Adhesive locomotion offers several advantages. First, gastropods have only one foot so they are mechanically simple and very stable. Second, gastropods are often found in habitats that are topologically complex and thus have evolved means of maneuvering through challenging terrains, for example, by adhering to the substrate which they are traversing. These advantages make robotic replication attractive.

Observations of crawling snails have allowed biologists to learn that the muscles along the foot of the snail drive deformations that propel the animal forward. The moving foot is divided into alternating bands of translating waves and interwaves, where waves correspond to regions of lateral compression in the foot. The waves have been classified as direct waves (propagating in the direction of the animal's movement in this case a snail) and retrograde waves (propagating in a direction opposite to the snail's movement). Differential friction between the foot and the ground in the wave and interwave segments is required to move the snail forward. As the snail propels itself forward, the forces created by muscles in the foot interact with the substrate (i.e., the surface across which the snail is moving) through a layer of mucus secreted by the snail, known as the pedal mucus. Locomotion is directly coupled to the stresses generated within this layer of mucus and is dependent on the dynamic and material properties of the mucus. It has been found that the requisite differential friction arises naturally if the applied stresses in the interwave region remain below the critical yield stress (such that the mucus acts as an adhesive), while stresses in the wave region are sufficient to create a flow in the mucus, propelling the snail forward in a "caterpillar-like" motion.

The advantages of gastropod locomotion, coupled with developments in material science and soft actuators, has lead to the design of some mechanical snails. For example, a paper by Ito et al. entitled "Film Structured Soft Actuator for Biomimetics of Snail's Gastropod Locomotion published at the $6^{th}$ International Conference Control, Automation, Robotics and Vision ICARCV'2000 (2000), describes a mechanical snail comprised of a series of electromagnets beneath a soft matrix. A layer of viscous fluid (emulating the pedal mucus) is deposited on a soft surface and a rigid snail is placed on top of the fluid. The electromagnets are activated in sequence, creating an out-of-plane wave in the surface, which propels the mechanical snail. However, this design is not ideal as it is not the snail that generates the waves, but rather by the surface. Thus locomotion is dependent on and driven by the surface and the snail is not self-propelled.

Another example of a mechanical crawling device is described in a paper by Mahadevan et al. entitled "Biomimetic Ratcheting Motion of a Soft, Slender, Sessile Gel," published in PNAS 101(1), 23 (2004), which uses soft hydrogel crawlers to investigate crawling movements. In this example, forward motion is produced by differential friction that is supplied by angled incisions in the gel. Thus, like Ito's design, it is the substrate that provides propulsive energy, and the snail is not self-propelled.

SUMMARY OF INVENTION

Aspects and embodiments of the present invention pertain to a mechanical crawler that moves via a wave driven in its foot. Crawlers according to various embodiments of the invention are adapted to traverse a surface (referred to herein as the "substrate"), e.g., the ground, the floor, a pipe or wall, etc., that is covered by a thin layer of viscous fluid, called the tractoring fluid. A crawler may comprise a body, a foot attached to the underside of the body, and a wave generator that is adapted to drive a wave in the crawler's foot. The crawler moves via interactions between this wave and the tractoring fluid, as discussed in detail below. Advantages of some embodiments of the crawlers according to the invention may include that the crawlers may possess a self-contained crawling mechanism (including the foot and the wave generator) and, unlike prior art crawlers, may not require energy input from the substrate. In addition, some embodiments of the crawlers may be insensitive to properties of the tractoring fluid, making these crawlers suitable for locomotion in a variety of different environments where different tractoring fluids may be present.

In one embodiment, a self-propelled mechanical crawler adapted to move on a medium (e.g. tractoring fluid) comprises a foot, a wave generator adapted to drive a periodic wave in the foot, and a wave transfer mechanism coupled between the wave generator and the foot and adapted to translate the periodic wave produced by the wave generator into a corresponding periodic deformation in the foot so as to generate forces in the medium to propel the crawler.

In one example, the wave generator may comprise a rotatable helix. The wave transfer mechanism may be comprised of a plurality of sheets coupled to the rotatable helix and to the foot and constructed and arranged to move in a vertical direction in response to rotation of the helix so as to produce the periodic deformation in the foot. Alternatively, the wave transfer mechanism may be comprised of a compliant mechanism. The crawler may further be comprised of a power module adapted to provide operating power to the wave generator. In some examples, the crawler may also include a controller which is coupled to the wave generator and is adapted to control at least one of a shape and/or wavelength of the periodic wave generated by the wave generator. In another example, the wave generator may comprise a plurality of actuators coupled to the controller, wherein the wave transfer mechanism comprises a corresponding plurality of attachment devices coupling each of the plurality of actuators to the foot, and wherein the controller is adapted to provide an actuation signal to the plurality of actuators to control movement of the plurality of attachment devices to drive the periodic wave in the foot.

According to another example, the crawler may further comprise at least one sensor adapted to provide data representing at least one parameter of an environment of the crawler. The at least one parameter may include at least one of temperature, pressure, and chemical composition. In addition, the crawler may further comprise a controller coupled to the sensor and adapted to receive the data from the at least one sensor and to store the data. In another example, the crawler may further comprise an energy harvesting module adapted to derive power from a surrounding environment of the crawler and to provide operating power for at least one component of the crawler.

In some embodiments, the crawler may be adapted to traverse surfaces such as an oil borehole, a floor of a body of water (e.g., a river bed, sea or lake floor), a pipe, or building ducts.

Another embodiment is directed to a method of producing locomotion in a mechanical crawler, the method comprising acts of generating a periodic wave within the mechanical crawler and driving the periodic wave in a foot of the crawler, wherein the driving act generates forces in the foot and in a surface over which locomotion is to be produced, the forces producing the locomotion. In one example, the act of generating the periodic wave may include generating a sinusoidal wave. In another example, the method may further comprise an act of controlling at least one of a shape and wavelength of the periodic wave.

According to another example of the method, the act of driving the periodic wave in the foot may include controlling motion of portions of the foot to produce the periodic wave in the foot. In addition, embodiments of the method may further include acts of sensing at least one parameter of an environment of the mechanical crawler and providing data representing the at least one parameter. The method may also include an act of harvesting energy from an environment of the mechanical crawler to providing operating power for at least one component of the mechanical crawler.

According to another embodiment, a self-propelled mechanical crawler may comprise a foot, means for generating a periodic wave, and means for coupling the periodic wave to the foot to produce locomotion of the self-propelled mechanical crawler. In one example, the crawler may also include means for producing a normal force in the foot.

Another embodiment of a crawler may be adapted to traverse a substrate comprising a layer of tractoring fluid disposed over a surface of the substrate. The crawler may comprise a sealed body, a foot coupled to an exterior surface of the sealed body, a wave generator disposed within the sealed body and adapted to drive a periodic wave in the foot, and a wave transfer mechanism coupled to the wave generator and to the foot, and adapted to deform the foot in accordance with a shape of the periodic wave so as to generate forces in the tractoring fluid to propel the crawler over the substrate. In one example, the crawler may be adapted to traverse a borehole and the tractoring fluid may comprise drilling mud. Alternatively, the substrate may include a floor of a body of water or a pipe.

One embodiment of a method of conveying an item in a borehole comprises acts providing a downhole crawler comprising a foot, a wave generator adapted to drive a periodic wave in the foot, and a wave transfer mechanism coupled between the wave generator and the foot and adapted to translate the periodic wave produced by the wave generator into a corresponding periodic deformation in the foot so as to generate forces to propel the crawler, coupling the item to the downhole crawler, and activating the crawler so as to move the crawler in the borehole. In one example, the item may include a cable disposed in the borehole and movement of the crawler may act of alleviate problems with the cable, such as differential sticking, as discussed further below. Alternatively, the item may include a sample collected in the borehole, or a sensor or tool for use in the borehole.

BRIEF DESCRIPTION OF THE DRAWINGS

The accompanying drawings are not intended to be drawn to scale. In the drawings, each identical or nearly identical component that appears in multiple figures is represented by a like numeral. For purposes of clarity, not every component may be labeled in every drawing. In the drawings.

DETAILED DESCRIPTION

Figure 1:
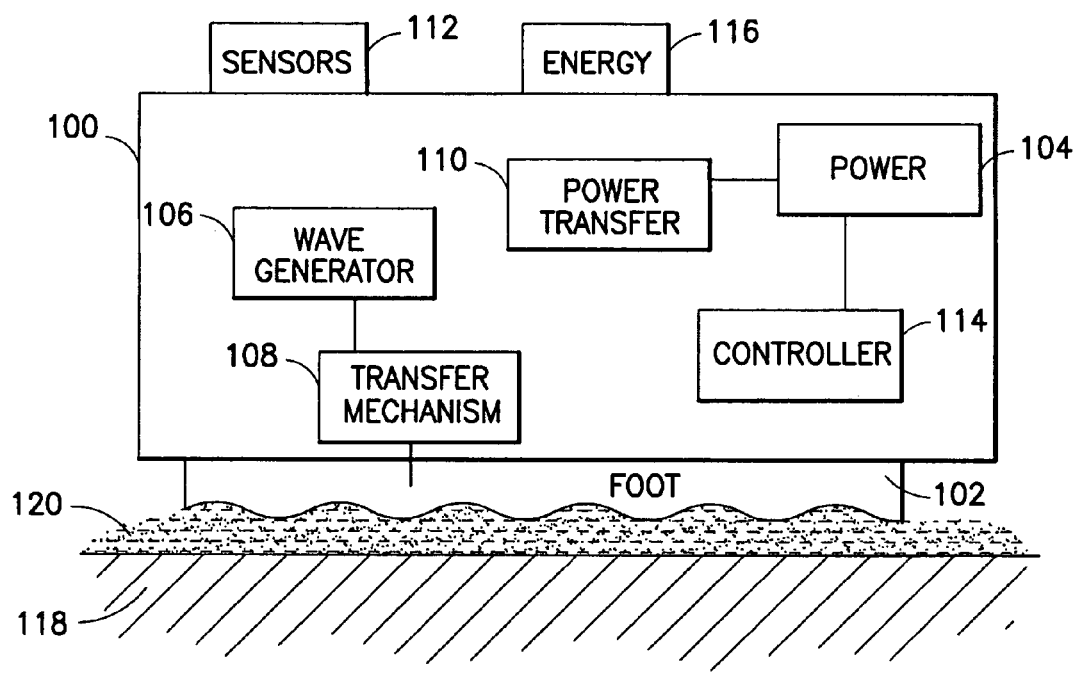
FIG. 1 is a block diagram of one embodiment of a mechanical crawler corresponding to the description of the invention herein.

Various embodiments and aspects of the invention will now be described in detail with reference to the accompanying figures. It is to be understood that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of the words "including," "comprising," "having," "containing," or "involving," and variations thereof herein, is meant to encompass the items listed thereafter and equivalents thereof as well as additional items.

Aspects and embodiments of the present invention are directed to a mechanical crawler that achieves motion via a wave driven in its foot. Crawlers according to various embodiments of the invention are adapted to traverse a surface (referred to herein as the "substrate"), e.g., the ground, the floor, a pipe or wall, etc., that is covered by a thin layer of viscous fluid, called the tractoring fluid. According to one embodiment, a self-propelled mechanical crawler may comprise a foot, a wave generator adapted to drive a periodic wave in the foot, and a wave transfer mechanism coupled between the wave generator and the foot and adapted to translate the periodic wave produced by the wave generator into a corresponding periodic deformation in the foot. The crawler moves via interactions between this wave (i.e., the forces provided by the deformations in the foot) and the tractoring fluid, as discussed in detail below. Locomotion can be controlled and optimized by controlling the shape and wavelength of the wave driven in the foot and by optimizing parameters and components of the crawler to adapt to known conditions and/or environments, as discussed further below. Advantages of some embodiments of crawlers according to the invention may include that the crawlers may possess a self-contained crawling mechanism (including the foot and the wave generator) and, unlike prior art crawlers, may not require energy input from the substrate. In addition, some embodiments of the crawlers may be insensitive to properties of the tractoring fluid, making these crawlers suitable for locomotion in a variety of different environments where different tractoring fluids may be present.

Referring to FIG. 1, there is illustrated a block diagram of one embodiment of a mechanical crawler according to aspects of the invention. It is to be appreciated that the term "crawler" as used herein refers to a device capable of self-propelled locomotion. The term is not intended to describe a particular form or type of movement and is not intended to be limiting with regard to either the speed of the movement or the design, shape or structure of the device. As shown in FIG. 1, the crawler comprises a body portion 100 including a number of modules that provide power and functionality, and a foot 102 for locomotion. Similar to biological gastropod locomotion, the crawler is adapted to drive an out-of-plane wave in this foot 102, which propels the crawler forward, as discussed in more detail below. The foot interacts with a tractoring fluid 120 that is disposed in a, generally thin, layer over the surface (substrate) 118 over which the crawler is to move. The tractoring fluid may be any type of viscous fluid, either Newtonian (e.g., water, oil, etc.) or non-Newtonian (e.g., mud, emulsions, etc.). Embodiments of crawlers described herein are insensitive to fluid properties and do not require specific properties for the tractoring fluid. The surface may be, for example, ground (e.g., soil, rock, etc.), or a pipe, borehole or other hole, and may have many different topographies and comprise many different compositions and consistencies. The surface, whatever it may be, is referred to generally herein as the "substrate"; this term is not intended to be limiting with regard to the type, location, composition, consistency or any other parameter of the surface.

In one embodiment, the crawler comprises a power module 104 that provides power to drive movement of the crawler. A wave generation module 106 may be configured to chive the wave in the foot 102, thereby causing the crawler to move, as discussed in detail below. The crawler further comprises a transfer mechanism 108 that couples the wave generator 106 to the foot to produce the wave in the foot, and a power transfer module 110 that couples power from the power module 104 to the wave generator 106. In some embodiments, the crawler further comprises a sensor module 112 that may be used to gather information regarding the environment in which the crawler is located, as well as information regarding the crawler itself. It is to be appreciated that the term "sensor module" as used herein is intended to mean a module comprising not only passive sensors (such as temperature or pressure sensors), but also active sensors, acoustic sensors, analytical modules (e.g., modules that may collect physical samples as well as data from the crawlers environment), vision sensors, such as a camera, infrared sensors or other devices for collecting data about the crawler's environment that can be represented as visual data, communication devices (such as a radio receiver and/or transmitter) and other devices that may provide or collect data about the crawler itself or its environment.

In some embodiments, the crawler may also comprise a controller 114 that may control various modules, such as the wave generator or power transfer mechanism, and may also include a storage element to store data collected by the sensor module. In addition, in some embodiments, the crawler may comprise an energy harvesting module 116 that may collect energy from the crawler's environment to replace or supplement the power module 104. Each of these modules, and their interaction with one another is described in more detail below. It is to be appreciated that not all the modules may be present in every embodiment of the crawler and, in some embodiments, one or more modules may be combined, as explained in more detail below. It is further to be appreciated that in some embodiments, not all the modules may be contained within or located proximate to the body of the crawler, but may located remotely, as discussed further below.

Figure 2A:
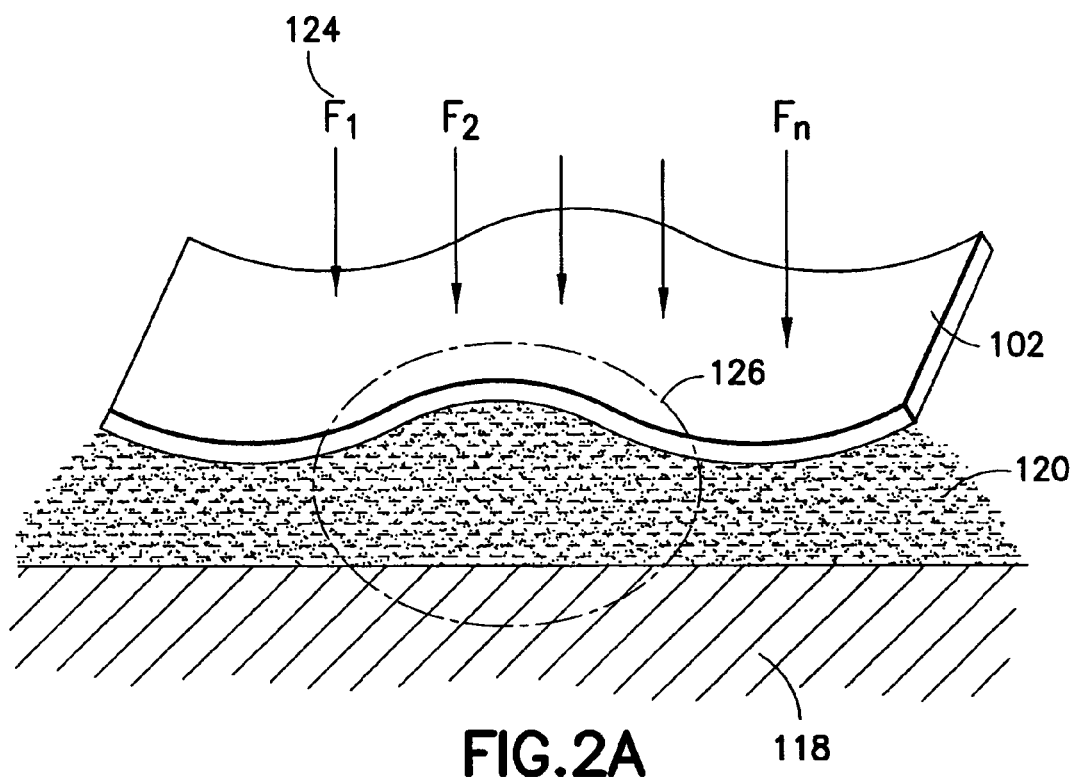
FIG. 2A is a diagram illustrating one embodiment of a foot of a crawler and forces in the foot and tractoring fluid upon which the foot is located.

According to one embodiment, locomotion via retrograde waves can be induced by out-of-plane waves generated on the underside of the foot 102. A crawler using this locomotive mechanism is referred to herein a retrograde crawler. Referring to FIG. 2A, there is illustrated an example of the foot 102 activated on the layer of tractoring fluid 120 located over the substrate 118. The foot is deformed in the shape of a traveling wave. Forces 124 applied to the foot generate the wave in the foot, causing the foot to deform in accordance with the wave shape. In the illustrated example, the wave is approximately sinusoidal, however, it is to be appreciated that the invention is not so limited and many other wave shapes may be used, as discussed below.

Figure 2B:
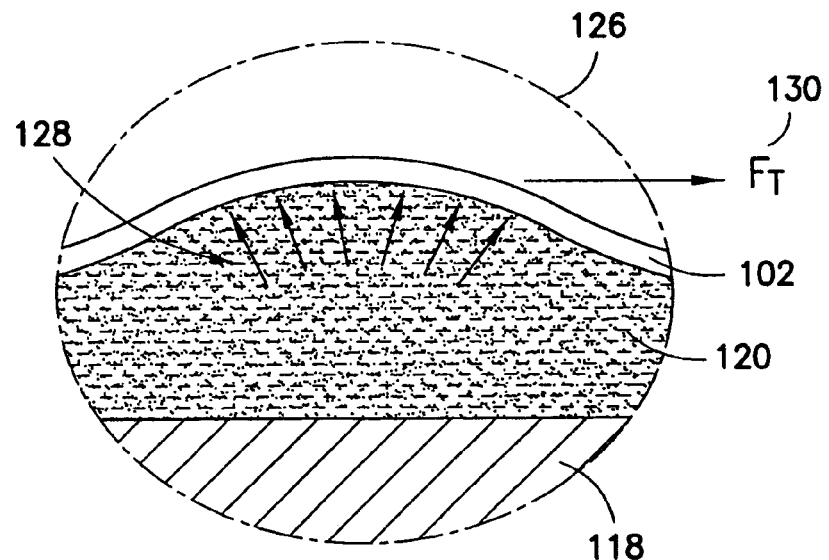
FIG. 2B is an enlarged view of the portion of FIG. 2A encompassed by line 126.
Figure 3A:
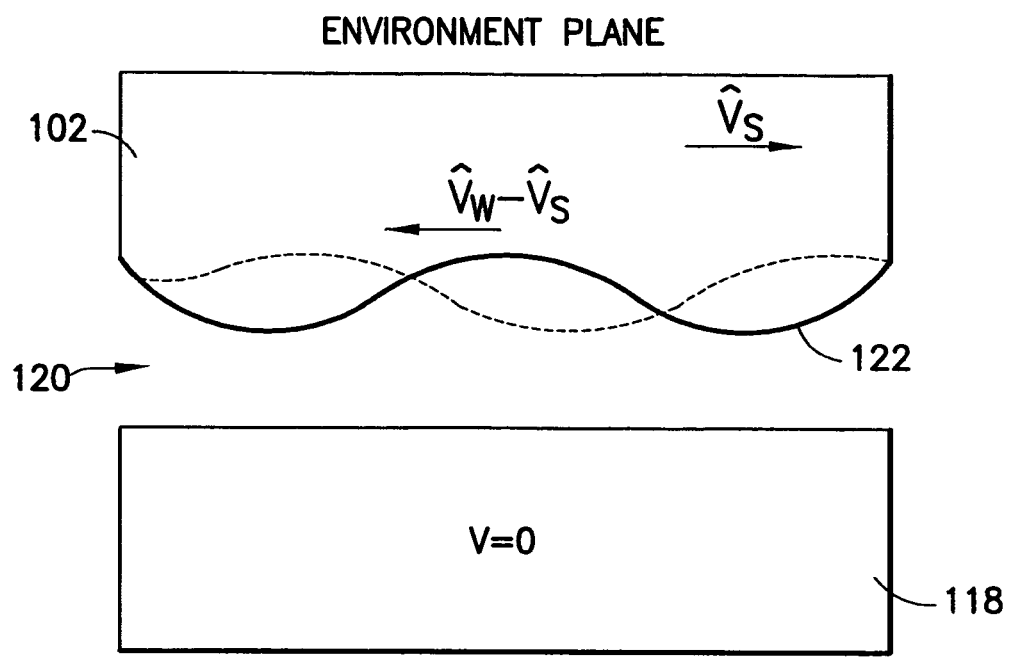
FIG. 3A is a schematic illustration of an out-of-plane wave in an environment frame, generated in a retrograde crawler according to aspects of the invention.
Figure 3B:
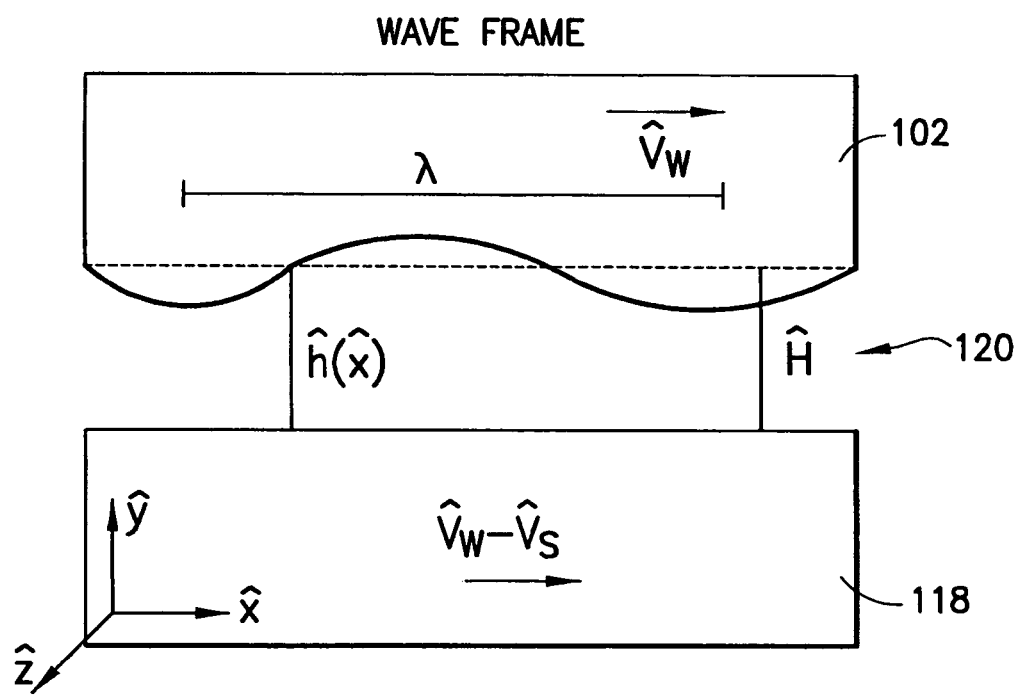
FIG. 3B is a schematic illustration of an out-of-plane wave in a wave frame, generated in a retrograde crawler according to aspects of the invention.

The propulsive power from retrograde waves is generated in a manner analogous to a peristaltic pump, and the physical mechanism can be understood as follows. Referring to FIGS. 3A and 3B schematic illustrations show out-of-plane waves in an environment frame (i.e., the substrate 118 is stationary in this frame) and a wave frame generated in a retrograde crawler. It is to be appreciated that the directional indicators (e.g., x, y and z axes, and direction of movement of the wave and/or the crawler) shown in FIGS. 3A and 3B are provided for the purpose of illustration only and are not intended to be limiting. As the lowest point 122 in the wave moves backwards (i.e., retrograde or in a direction opposite to forward motion of the crawler), tractoring fluid to the left of the wave is squeezed into a narrow gap, resulting in an increase in pressure. Conversely at the back of the wave, tractoring fluid flows unobstructed into a widening gap, resulting in a decrease in pressure. These two pressures, acting normal to the interface between the foot and the tractoring fluid, result in a net tractoring force opposite to the direction of wave propagation. FIG. 2B, which illustrates an enlarged view of the portion of FIG. 2A surrounded by line 126, shows the forces 128 in the tractoring fluid 120 produced by the wave, which result in the net tractoring force 130. The tractoring force 130 propels the crawler forward, in a direction opposite to wave propagation, with a velocity $\hat{V}_s$.

Given that the power module 104 and the power transfer module 110 (see FIG. 1) can drive a deflection at a speed $\hat{V}_w$ in the foot 102, it may be desirable to calculate the resulting velocity of the crawler. For simplicity, the following calculations to determine the velocity of the crawler are performed in a reference frame moving with the wave (referred to as the wave frame) such that the shape of the foot 102 is not time-dependent. Thus, in the wave frame, $\hat{h}=\hat{h}(x)$, in other words, the shape of the foot as a function of the x is not time dependent. As mentioned above, retrograde crawlers according to aspects of the invention can operate in tractoring fluids that are either Newtonian or Non-Newtonian. Thus, for convenience of calculations, it is assumed for the velocity calculation that the tractoring fluid is a Newtonian fluid (i.e., a fluid, such as liquid, in which shear stress is proportional to the strain rate). In addition, a two-dimensional crawler that is periodic in the $\hat{x}$ direction is considered, where $\hat{V}_s$ is the velocity of the crawler as measured in the environment frame and $\hat{V}_w$ is the wave velocity as measured in the wave frame.

As discussed above, the tractoring fluid is generally a thin layer of fluid. Therefore, referring to FIG. 3B, it can be assumed that the average gap thickness $\hat{H}$ between the foot 102 and the substrate 118 (i.e., the average thickness of the layer of tractoring fluid) is much smaller than the wavelength $\lambda$ of the wave, and a standard lubrication approximation can be used to model the tractoring fluid in the gap. For the moving crawler, conservation of momentum in the $\hat{x}$ and $\hat{y}$ directions is given by:

$$\frac{\partial \hat{p}}{\partial \hat{x}} = \mu \frac{\partial^2 \hat{u}}{\partial \hat{y}^2}, \quad \frac{\partial \hat{p}}{\partial \hat{y}} = 0 \quad (1)$$

where $\hat{p}$ is pressure, $\mu$ is the viscosity of the tractoring fluid, $\hat{u}$ is the velocity in the $\hat{x}$ direction and hats ( ˆ ) indicate dimensional quantities. For crawlers with small gap sizes and/or viscous tractoring fluids the Reynolds number in the system is small, thus we may neglect inertial terms in the analysis. The variables from equation 1 can be rescaled as follows to make the final equation non-dimensional:

$$\hat{y} = \hat{H}y, \quad \hat{u} = \hat{V}_w u, \quad \hat{h} = \hat{H}h, \quad \hat{V}_s = \hat{V}_w V_s \text{ and } \hat{p} = \frac{\lambda \mu \hat{V}_w}{\hat{H}^2} p$$

such that the momentum equation in the $\hat{x}$ direction becomes:

$$\frac{\partial p}{\partial x} = \frac{\partial^2 u}{\partial y^2} \quad (2)$$

subject to the boundary conditions: $u(0)=1-V_s$ and $u(h)=1$.

As can be seen from equation 2, the momentum is a function of the second derivative of the crawler velocity u. Therefore, equation 2 can be integrated twice to solve for the crawler velocity in the $\hat{x}$ and $\hat{y}$ directions, yielding:

$$u(x, y) = \frac{1}{2}\frac{dp}{dx}y(y-h) + V_s\left(\frac{y}{h} - 1\right) + 1 \quad (3)$$

At steady state, the volume flux per unit width through a plane normal to the substrate given by:

$$Q = \int_0^h u \partial y$$

must be constant for all $\hat{x}$. Therefore, integrating equation 3 from 0 to h and solving for the pressure gradient we find:

$$\frac{dp}{dx} = \frac{12}{h^3}\left[h\left(1 - \frac{1}{2}V_s\right) - Q\right] \quad (4)$$

Since h(x) is periodic, p(1)=p(0) and this condition may be used to solve for the unknown quantity Q. Specifically, $$\int_0^1 \frac{dp}{dx}dx = p(1) - p(0) = 0 \quad (5)$$

Therefore, integrating equation 4 over one wavelength, applying condition 5 and solving for Q, we find:

$$Q = \left(1 - \frac{1}{2}V_s\right)\frac{I_2}{I_3} \text{ where } I_j = \int_0^1 \frac{dx}{h^j} \quad (6)$$

From the above equations, given the waveshape h(x), the dimensionless flux Q can be computed, which in turn provides the pressure gradient dp/dx and the fluid velocity profile u(x). To find the velocity of the crawler, a force balance can be performed on the foot. The traction acting on the foot is F=σ·n̂ where σ is the dimension fluid stress tensor (which depends on the fluid that is used as the tractoring fluid) and n̂ (not shown in the figures) is the unit outward normal to the foot. Integrating over x and applying a force balance over the entire foot of the crawler in the x direction to the lowest order in $\hat{H}/\lambda$ yields (in dimensionless form):

$$\int_0^1 p\frac{dh}{dx} + \frac{du}{dy}\bigg|_{y=h} dx = 0 \qquad (7)$$

As mentioned above, the calculations have assumed steady state motion of the crawler, i.e., the crawler is not accelerating but is traveling at a steady velocity $V_s$. The first term in the above integral represents the pressure forces acting normal to the foot and the second term represents viscous drag. Integrating the first term by parts and substituting equation 4 for dp/dx yields:

$$3QI_2 = (3-2V_s)I_1 \qquad (8)$$

Finally, using the expression for Q from equation 6 and defining the following shape function:

$$A = \frac{I_2^2}{I_1 I_3} \qquad (9)$$

the velocity of the crawler is given by:

$$V_s = \frac{6(1-A)}{4-3A} \qquad (10)$$

Thus, for a given shape of deformation of the foot (which is dependent on the shape of the wave produced by the wave generator), a given wave speed and a Newtonian tractoring fluid, the crawler will move forward at a velocity given by equation 10.

Figure 4:
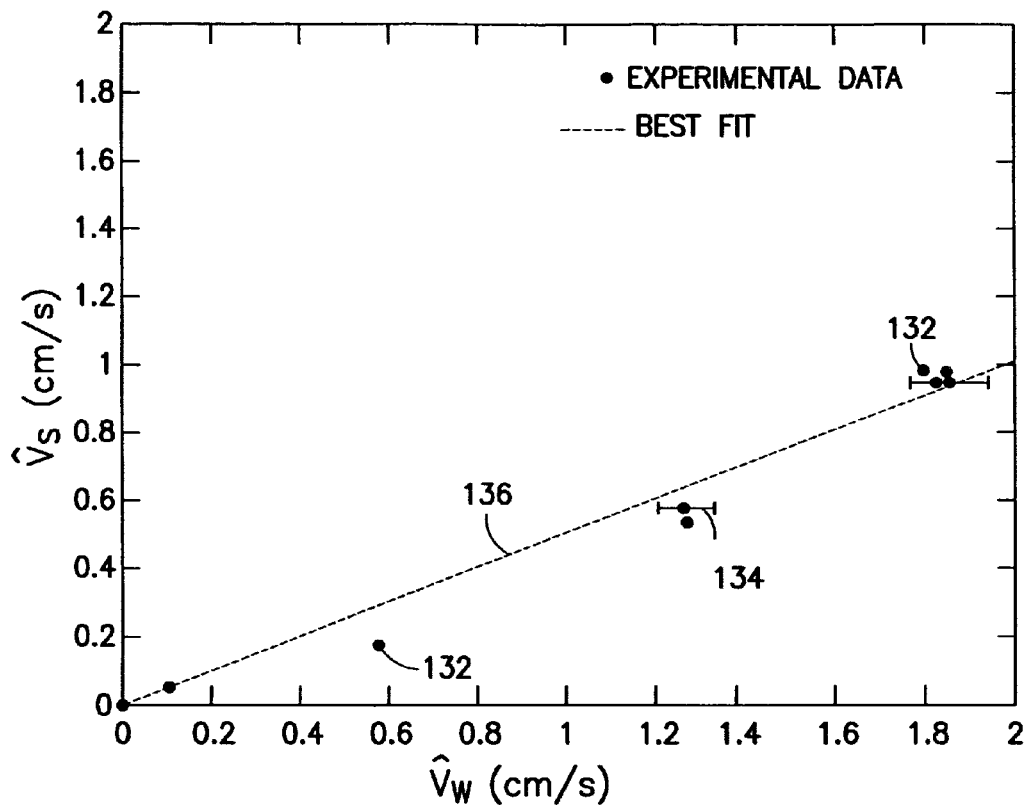
FIG. 4 is a graph illustrating velocity of the crawler as a function of wave velocity.

An embodiment of a retrograde crawler was constructed to measure its velocity to verify the above equations. A test track having a width slightly greater than the width of the foot of the crawler was prepared and covered with a 5 millimeter layer of glycerol acting as the tractoring fluid. After the crawler motion reached steady state, measurements of wave speed and crawler speed were recorded. Referring to FIG. 4, there is illustrated a graph of such recorded velocity data, showing the retrograde crawler velocity as a function of wave velocity. Points 132 are experimental data points, with characteristic error bars 134. Graph line 136 is a best fit curve for the data points 132. As expected, the crawler velocity scales linearly with wave velocity. The slope of the graph line 136 is set by the gap thickness between the foot and the substrate. Locomotion of the crawler is driven by stresses in the tractoring fluid, verified by the fact that a crawler activated on dry land without any tractoring fluid present, moves slowly in the direction of wave propagation (opposite to the direction of motion with the tractoring fluid present), illustrating the importance of the tractoring fluid.

Equation 10 describes the velocity of a crawler on a horizontal surface. The above calculations can also be modified to account for an inclined substrate by adding a gravitational body force into equation 7 yielding:

$$-W\sin\phi = \int_0^1 p\frac{dh}{dx} + \frac{du}{dy}\bigg|_{y=h} dx \qquad (11)$$

where $\phi$ is the angle of inclination measured from the horizontal, and $$W = \frac{\hat{H}mg}{\mu \hat{V}_w \lambda b}$$

where W is a dimensionless weight parameter, g is gravity, m is the mass of the crawler and b is the width of the crawler in the z direction. Solving for the velocity of the crawler, we find:

$$V_s = \frac{6(1-A)}{4-3A} - \frac{W\sin\phi}{I_1(4-3A)} \qquad (12)$$

Thus, the tangential force balance indicates that the crawler may climb any surface provided that:

$$6(A-1) > \frac{W}{I_1}\sin\phi$$

However, it is noteworthy that the normal force balance may limit the crawler's climbing capability to angles of inclination $\phi<\pi/2$. In other words, because there is no normal force adhering the crawler to the substrate, the crawler may not be able to traverse overhangs or truly vertical walls. Therefore, in some embodiments, the crawler may be best suited to horizontal rather than highly deviated surfaces. However, it is to be appreciated that this restriction applies only to the Newtonian case considered in the above calculation. The actual invention is not so limited. For example, a crawler may be provided with a mechanism, such as a centralized arm as described further below, to provide sufficient normal force, such that the crawler may be able to traverse highly inclined substrates.

Figure 6:
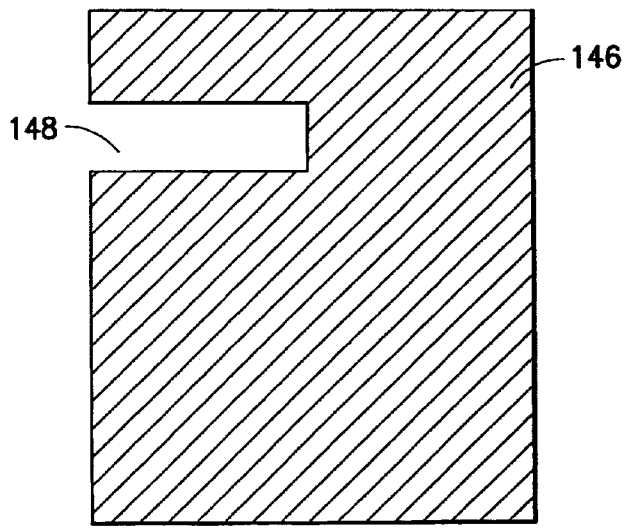
FIG. 6 is a diagram of one embodiment of a wave transferring mechanism according to aspects of the invention.
Figure 5:
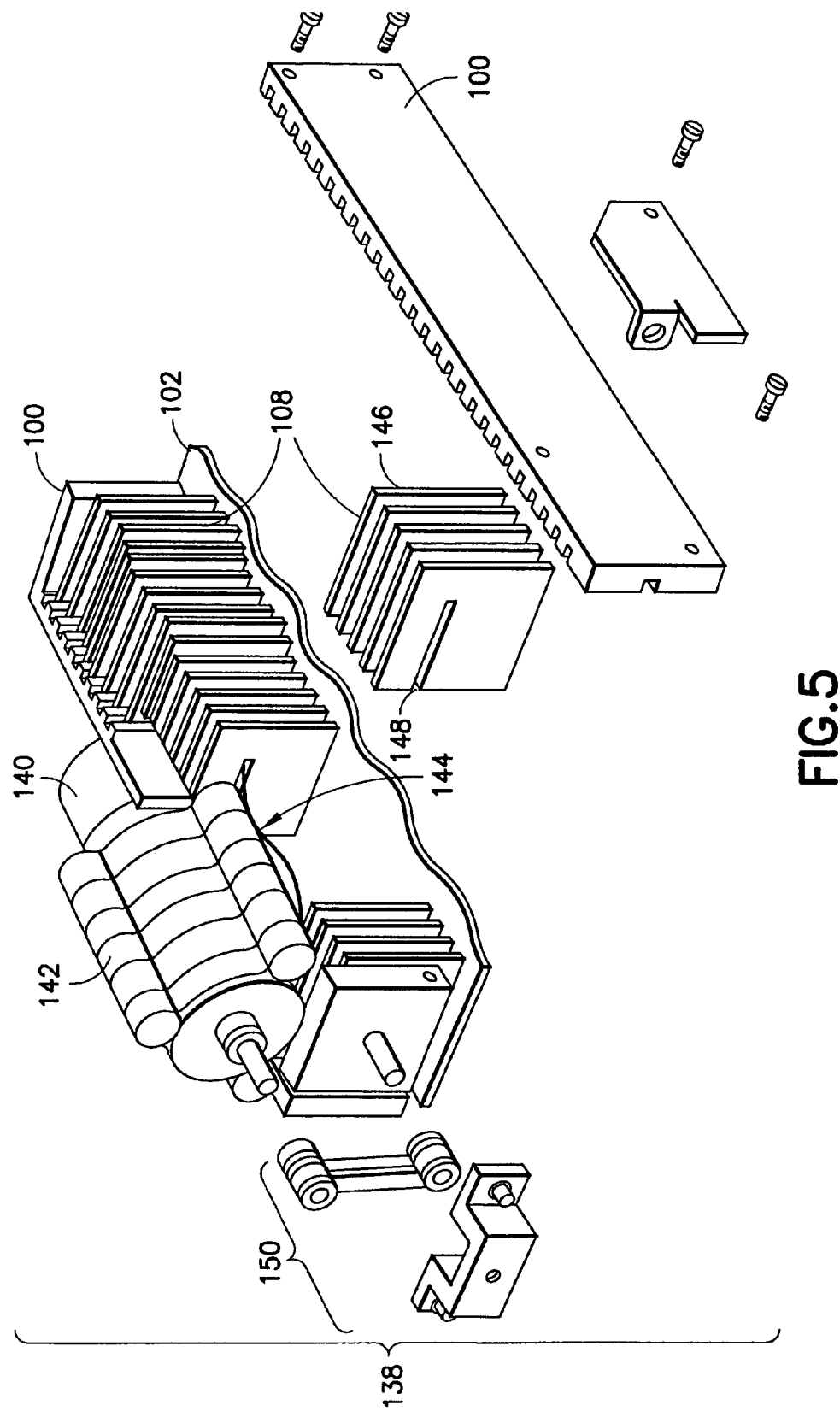
FIG. 5 is an exploded perspective view of one embodiment of a mechanical crawler according to aspects of the invention.

As discussed above in reference to FIG. 1, the crawler includes a wave generator 106 and transfer mechanism 108 that drive the wave in the foot 102 to produce crawler movement. The wave generator provides the wave, with a given waveshape, to drive the crawler velocity as given by the equations above. According to one embodiment, the wave generator and transfer mechanism may comprise one or more mechanical systems or sub-systems. Referring to FIG. 5, there is illustrated an exploded view of one embodiment of a crawler according to aspects of the invention. In this embodiment of a crawler 138, the power transfer module 110 (see FIG. 1) includes a direct current (DC) motor 140 that may be powered by the power module 104 (not shown). For example, the power module 104 (see FIG. 1) may include an external (i.e., not located within the body 100 of the crawler) DC power source. However, it is to be appreciated that the power module is not limited to being a DC power source, as discussed further below. The wave generation module 106 (see FIG. 1) comprises a helix 144 and the transfer module 108 (see FIG. 1) comprises a plurality of sheets 146 with perforated slots 148. The helix 144 passes through the slots 148 to couple the helix 144 to the plurality of sheets 146. Each of the plurality of sheets 146 is constrained to vertical motion as they ride in equally spaced tracks along the body 100. The plurality of sheets are coupled to the foot 102. For example, the sheets may be fastened or adhered (e.g., glued) to the foot. Referring to FIG. 6, there is illustrated more clearly one possible embodiment of a sheet 146, including a slot 148, according to aspects of the invention. It is to be appreciated that the sheets 146 are not limited to the shape illustrated in FIG. 6, which is provided as one example only. The sheets may have many other shapes and structures, so long as they provide the functionality of coupling the wave generated by the helix 144 (or another embodiment of the wave generator 106) to the foot.

Referring again to FIG. 5, the power transfer module may further include a gearbox 142 coupled to the DC motor 140 and to the helix 144. In the illustrated example, the gearbox is coupled to the helix using a toothed pulley 150. When the helix 144 is spun by the motor and the gearbox, it causes the plurality of plates 146 to translate up and down inside their tracks in a traveling sinusoidal wave, thus generating the wave in the foot 102.

As discussed above, this sinusoidal wave generates regions of high pressure in front of the wave where the tractoring fluid is squeezed into a narrow gap, and regions of low pressure behind the wave where the tractoring fluid is allowed to expand. These pressures generate forces in the tractoring fluid which propel the crawler forward. One specific example of this embodiment of a crawler was constructed to obtain the data illustrated in FIG. 4. In this example, the crawler included a solid polycarbonate body 100, the helix 144 was a shallow brass helix, and the plurality of plates 146 were made of aluminum. Brass may be an advantageous material for use in the helix because it is a relatively low-friction material. However, it is to be appreciated that the crawlers of the invention are not limited to this example and may be constructed using many different embodiments for the different modules (as discussed further below) and many different materials for each component. In addition, the wave generated by the wave generation module 106 is not limited to being a sinusoidal shape and a variety of other wave shapes may be used, as discussed further below.

Figure 7:
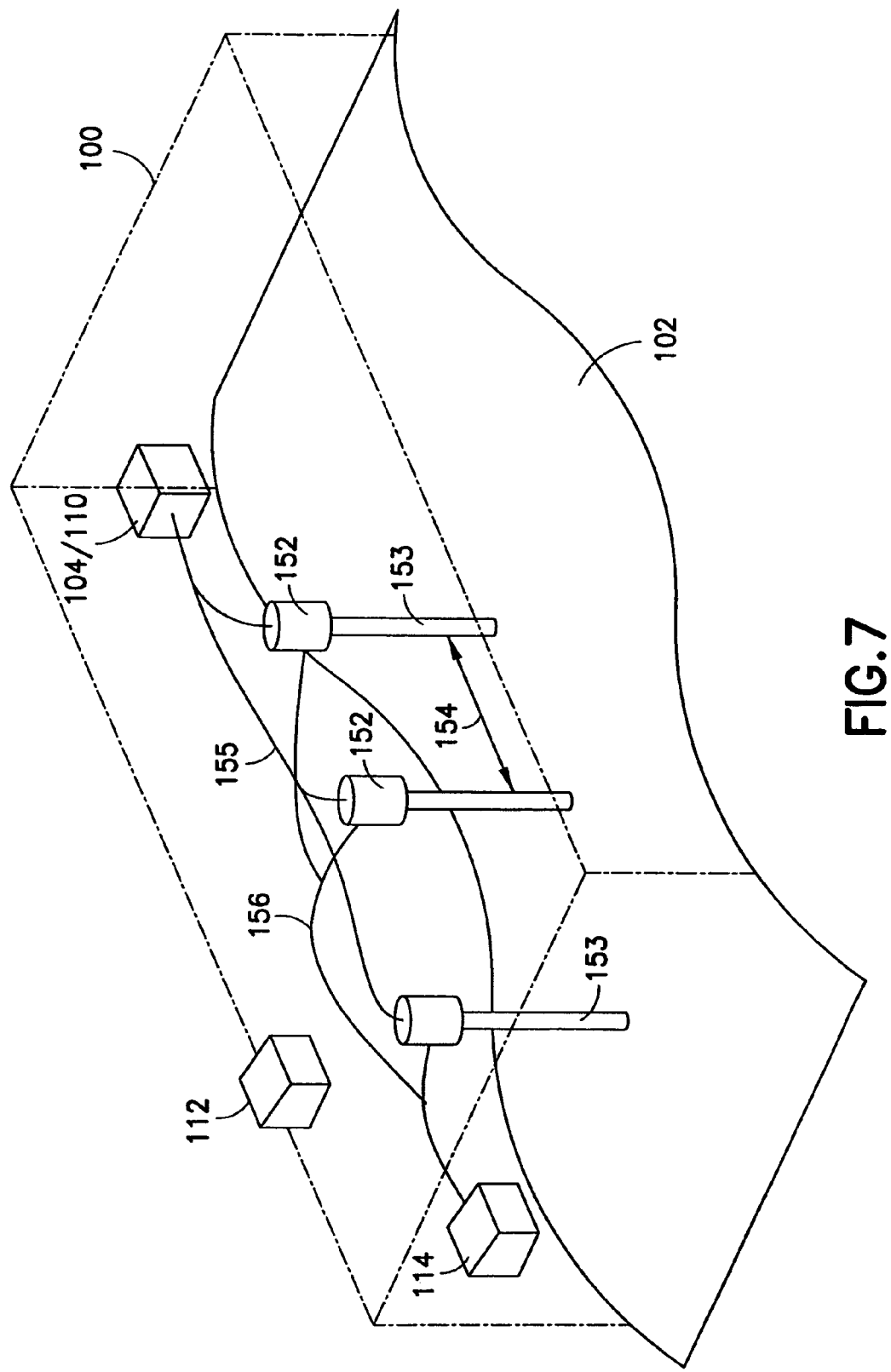
FIG. 7 is a diagram of another embodiment of a crawler including an example of a wave generator according to aspects of the invention.

According to one embodiment, the wave generator 106 (see FIG. 1) and transfer mechanism 108 may be combined and coupled to a controller 114. Referring to FIG. 7, there is illustrated another embodiment of a crawler according to aspects of the invention. In this embodiment, the helix and plurality of plates making up the wave generator and transfer mechanism are replaced with a plurality of actuators 152 that are coupled to the foot 102 via a corresponding plurality of coupling devices 153. The actuators are coupled to and controlled by the controller 114. In one example, the actuators 152 may be mounted to the body 100. However, it is to be appreciated that the actuators may also be simply contained within the body 100 and need not necessarily be directly mounted to the body. In addition, the actuators may be coupled to the power module 104 or to the power transfer module 110 to receive actuation power on power lines 155. It is to be appreciated that in this embodiment, the actuators may be directly coupled to the power module and the crawler may thus not include a power transfer module 110.

In one embodiment, the actuators 152 may be actuated in response to a control signal generated by the controller 114 on lines 156. The coupling devices 154 may be coupled to the foot 102 at predefined intervals that may be equally spaced or variably spaced. Coupling may be achieved through any suitable mechanism including, but not limited to, adhesion (e.g., gluing), fastening (e.g., with screws, clips, studs or any other type of fastener), binding etc. When the actuators 153 are actuated by the control signal, the coupling devices 154 may move vertically up or down, thus deforming the foot and producing a wave in the foot to drive locomotion, as described above in connection with other embodiments. The shape of the wave produced in the foot may be determined, at least in part, by the spacing 154 between couplings of the actuators to the foot and/or by the control signal. For example, the control signal may govern the sequence in which the actuators are actuated and the timing between actuation of consecutive actuators, which will influence the waveshape. In one example, the actuators 152 may be evenly spaced along the foot 102 and the control signal may actuate the actuators in sequence to produce a sinusoidal wave in the foot, similar to the wave produced by the helix described above.

According to another embodiment, the controller 114 may include, for example, a microprocessor including an associated memory device, that may be programmed to produce one or more control signals to actuate the actuators 152. In one embodiment, the controller may be programmed with a selection of actuation sequences such that the controller can produce control signals to actuate the actuators so as to generate a selection of different waveshapes in the foot. For example, the controller may output a control signal adapted to generating a sinusoidal wave in the foot. Alternatively, the control signal may be adapted to generate a square wave, sawtooth or other periodic waveform. The controller may be programmed to select an appropriate control signal based on either a predetermined operating state or on an external signal or environmental factors, as discussed further below. For example, in one embodiment, the crawler may be adapted to receive an external signal that may direct the controller to select an appropriate control signal to generate a given waveshape. Alternatively, the controller may be programmed with a specific control signal before the crawler is activated. It is to be appreciated that the controller may be implemented in hardware and/or software in numerous ways known to those skilled in the art. For example, the controller may be a microprocessor capable of being programmed with software including one or more series of instructions for generating one or more control signals. In another example, the controller may be implemented using discrete, hardwired components, such as an application specific integrated circuit (ASIC).

An advantage of an embodiment of the crawler using a controlled plurality of actuators to drive the wave in the foot may be that the design is flexible and capable of producing different waveshapes without requiring any physical changes in the structure of the crawler. As discussed above, an appropriate control signal can vary the waveshape produced in the foot without any need to modify, for example, the spacing at which the actuators are coupled to the foot via the coupling devices. Thus, a purely "electronic" or software change, namely changing the control signal which defines the actuation sequence and timing of the actuators, can adapt the crawler's movement, for example, to accommodate different environments.

Figure 8:
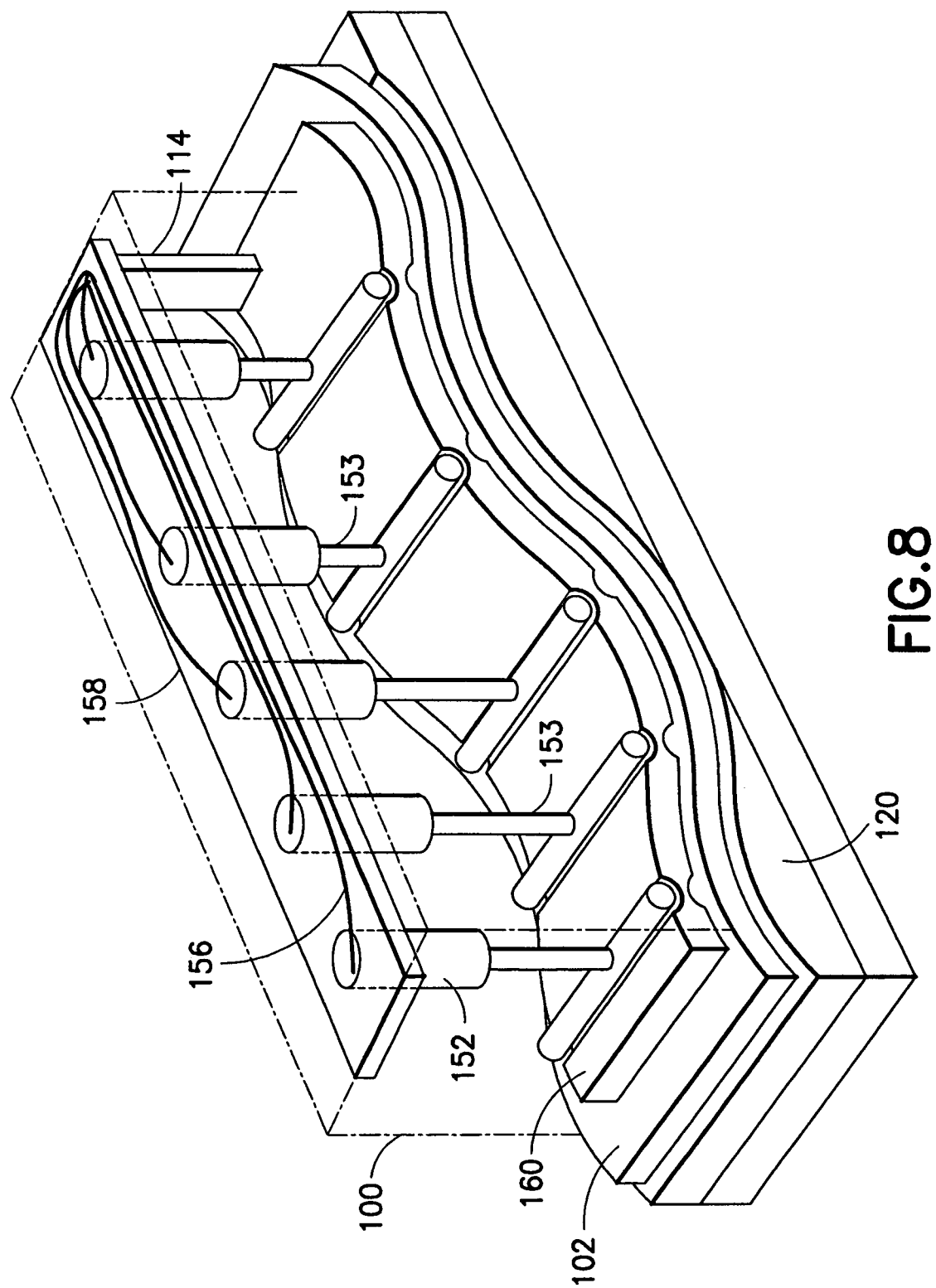
FIG. 8 is a diagram of another embodiment of a crawler including another example of a wave generator according to aspects of the invention.

Referring to FIG. 8, there is illustrated an embodiment of a crawler including another example of a wave generator and transfer mechanism according to aspects of the invention. In this embodiment, the wave generator may again include a plurality of actuators 152 coupled to a controller 114 by control lines 156. The actuators may be powered by a power module (not shown) and the crawler may or may not include a power transfer module (i.e., as discussed above, the actuators may be coupled directly to the power module). Also as discussed above, the actuators may be mounted directly to the crawler body 100 or, for example, to a mounting plate 158. In this embodiment, the actuators 152 are coupled, via coupling devices 153, to a compliant mechanism 160 which is coupled to the foot 102. The compliant mechanism acts as the wave transfer mechanism (106, see FIG. 1) to drive a traveling out-of-plane wave in the foot 102 of the crawler. Alternatively, in another embodiment (not illustrated), the compliant mechanism 160 itself may act as the foot 102, obviating the need for a separate foot component and simplifying the design of the crawler for some applications.

Figure 9:
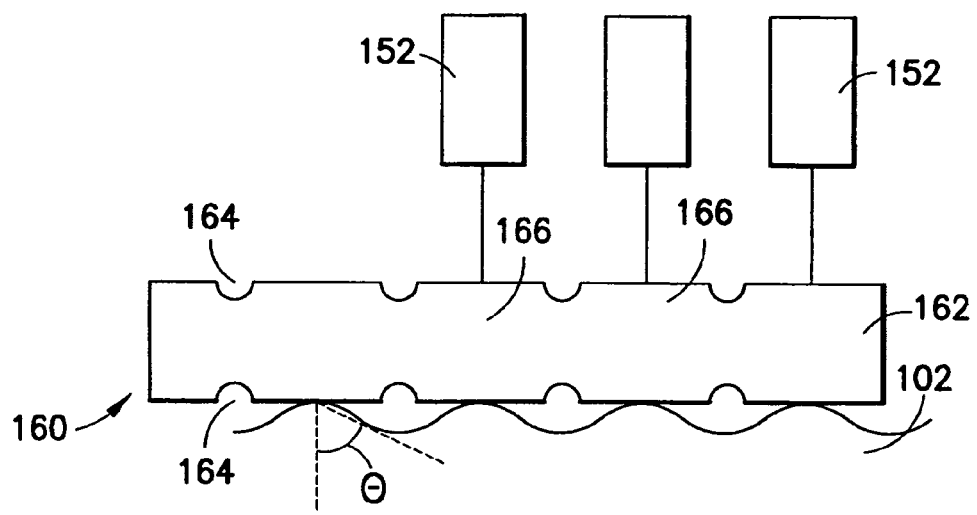
FIG. 9 is an illustration of one example of a compliant mechanism that may be used to drive a traveling wave in a foot of a crawler according to aspects of the invention.

A compliant mechanism is a structure that has a particular rest-state shape and that is capable of deforming under force or pressure to a shape different than its rest-state shape. Once the force or pressure is removed, the compliant mechanism returns automatically to its rest-state shape without requiring additional input of force or pressure. Compliant mechanisms use flexural elements to replace traditional pin-pivoting joints as these flexural elements are more robust, and therefore may be a preferable design. Referring to FIG. 9, there is illustrated an example of a compliant mechanism 160 that may be used in embodiments of crawlers according to aspects of the invention. In this example, the compliant mechanism 160 comprises a sheet 162 constructed to define a plurality of cut-outs 164. The plurality of actuators 152 are coupled to sections 166 of the compliant mechanism, between the cut-outs 164, as illustrated. The foot 102 is coupled to an opposite side of the compliant mechanism. In the illustrated example, the compliant mechanism 160 may be approximately flat in its rest-state, as shown. When force is applied to the sections 166 by actuation of the actuators 152, the mechanism deforms, thereby applying force to the foot and generating a traveling out-of-plane wave in the foot in a manner similar to the way the plurality of sheets 146 (see FIG. 5) generate a wave in the foot through their up and down movement discussed above. The degree of deformation may be defined, at least in part, by the spacing and shape of the cut-outs 164 as well as the material properties of the mechanism. In one example, the maximum angle of deformation θ may be less than or equal to approximately 30 degrees. The compliant mechanism may be formed from any suitable material, for example, from a plastic such as Debrin®, or from a metal such as beryllium-copper. Materials for the compliant mechanism may be chosen based on the rate of yield stress to Young's modulus of the material.

It is to be appreciated that crawlers according to aspects of the invention may be constructed using any of the various mechanisms for the wave generator and wave transfer module discussed above. In addition, combinations of the elements described above may also be used. For example, a crawler may be constructed using a helix (such as helix 144 in FIG. 5) for the wave generator and a compliant mechanism (such as the compliant mechanism 160 in FIG. 9) in the wave transfer module, with the helix being appropriately coupled to the compliant mechanism. The examples and embodiments of wave generators and wave transfer modules described herein are intended to illustrate the functionality of these elements and provide examples of some preferred embodiments. However, it is to be appreciated that the invention is not limited to these embodiments, nor to the illustrated structures and shapes.

An advantage of the embodiments of retrograde crawlers described herein may be that the crawlers can be constructed to be insensitive to characteristics of the tractoring fluid. Thus, the crawlers may be suitable for locomotion in a variety of environments and over many different types of surfaces including, for example, drilling mud. In many applications, this may be a particularly useful advantage. For example, in the oilfield services industry, there is frequently a need to collect data on environmental parameters inside boreholes. Conventional tools and equipment for collecting such data, referred to herein as "logging tools" may be very expensive and complicated to adapt to differing environments. For example, a borehole may be drilled in a number of different rock formations in different locations and thus the interior surface of the hole may vary. In addition, the borehole may be filled or partially filled with fluid, such as drilling mud and/or water. It may be particularly advantageous to be able to use crawler such as those described herein, which may be significantly cheaper and more flexible than conventional logging tools, to gather data.

Figure 10A:
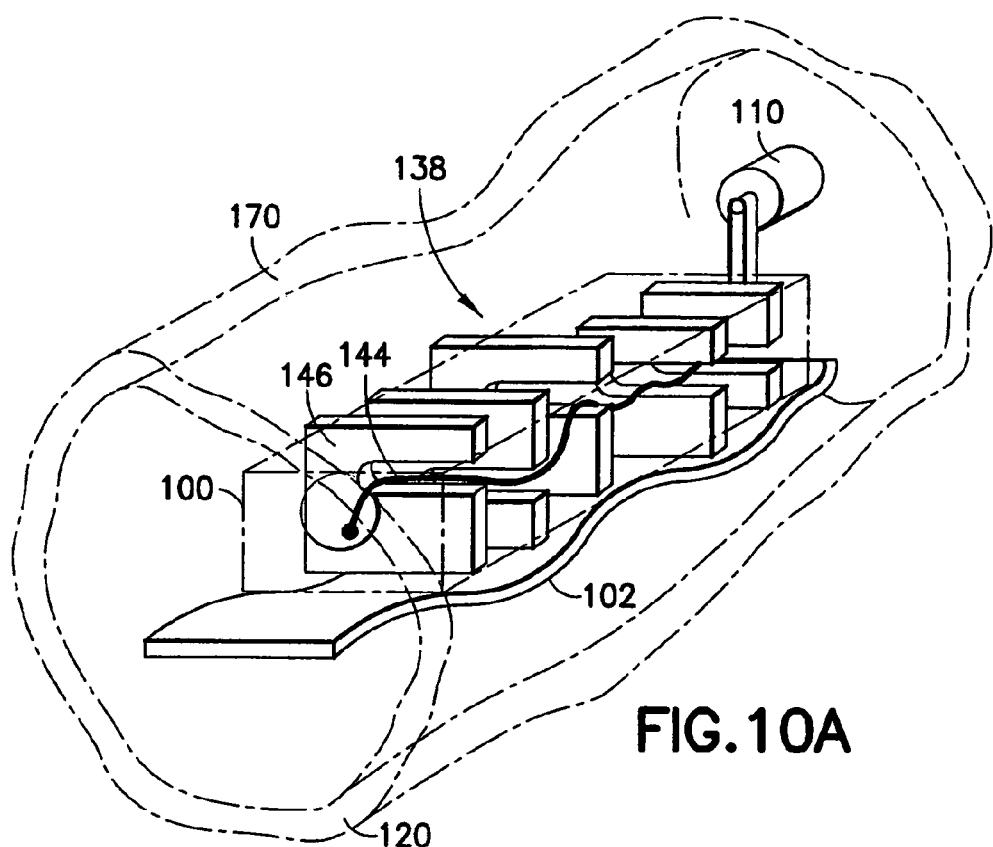
FIGS. 10A and 10B are an illustration of another embodiment of a crawler disposed in an open hole, according to alternative aspects of the invention.
Figure 10B:
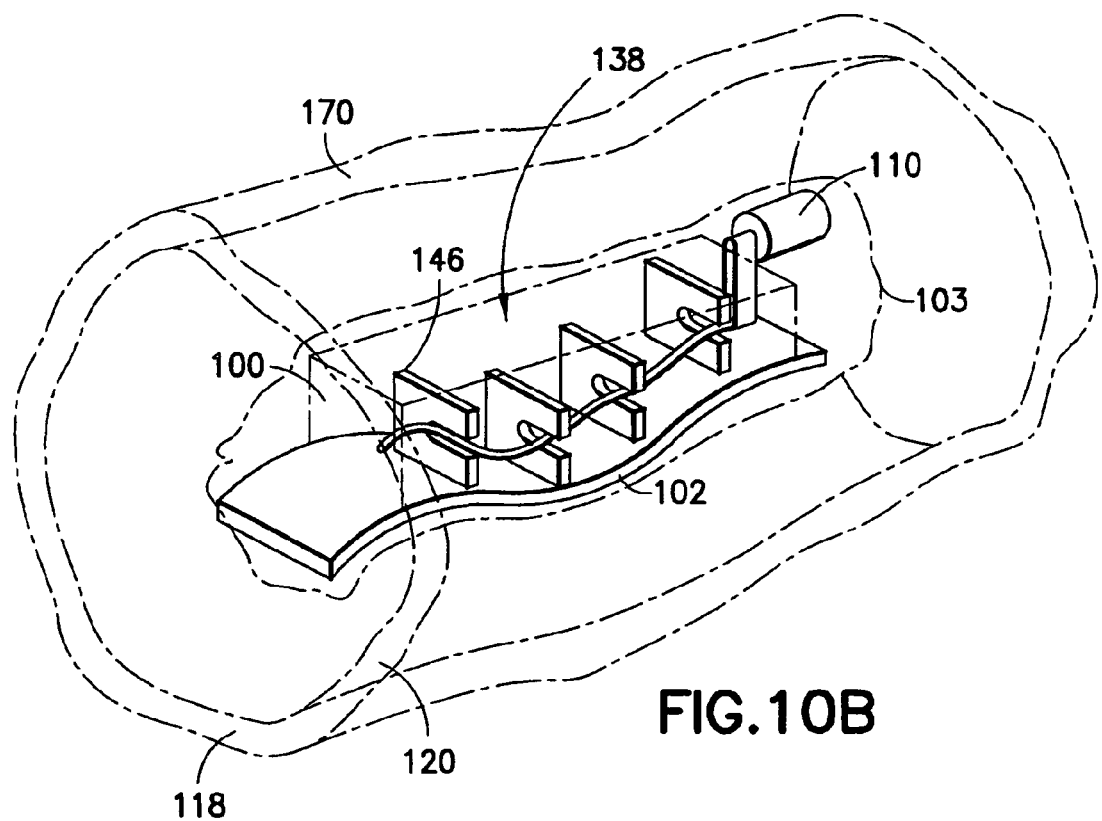

Referring to FIG. 10A, there is illustrated one embodiment of a crawler located in a borehole 170. It is to be appreciated that although the following discussion may refer primarily to holes and/or pipes in the context of boreholes used in the oil and gas industry, the invention is not limited to use in such boreholes and crawlers according to various embodiments of the invention are suitable for locomotion in many other environments and may be useful for many other applications. The crawler 138 may traverse the inside of the hole, using a wave driven in the foot 102 for locomotion, as discussed above. The crawler may include a sensor module 112 (see FIG. 1) to measure environmental parameters, such as temperature, pressure and/or chemical composition of the substrate, and to record data about these parameters, as discussed further below. Alternative, as shown in FIG. 10B, the crawler 138 could be wrapped inside a housing made of a flexible material 103 that would isolate it from the environment where it would crawl. It is also to be appreciated that although the crawlers illustrated in FIGS. 10A and 10B include the helix 144 and plurality of sheets 146 for the wave generation and wave transfer modules, crawlers for use in such holes or pipes may include any of the mechanisms described above and are not limited to the example illustrated in FIGS. 10A and 10B.

Figure 11:
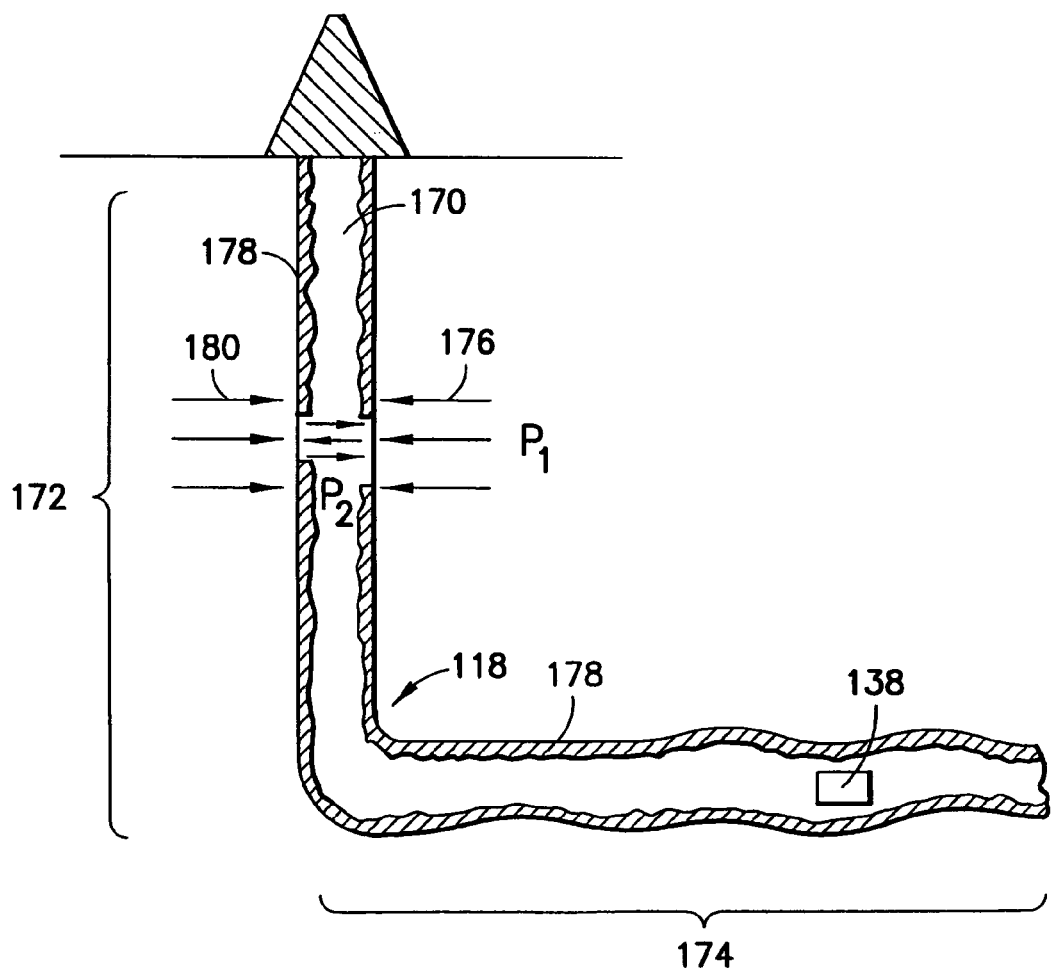
FIG. 11 is an illustration of an open hole showing differential pressure forces.

For boreholes used in the oil and/or gas industry, a borehole 170 is formed generally in a rock formation which can be considered as the substrate 118. The tractoring fluid 120 may be, for example, a mud 178 deposited on the inner surface of the hole 170 as part of the operation that creates and maintains the hole. For example, referring to FIG. 11, there is illustrated a diagram of a borehole. The borehole 170 is formed in the substrate 118 (e.g., rock formation) and includes a vertical, or inclined portion 172 and a horizontal (or approximately horizontal) section 174. It is to be appreciated that the borehole 170 need not have an approximately vertical and approximately horizontal structure as illustrated in FIG. 11 but may have many different inclinations. For example, the borehole may be deviated and/or highly deviated in some portions or over its entirety. In the illustrated example, the borehole may be drilled vertically (or inclined) to a desired depth (e.g., a depth at which oil or gas is located or is suspected to be located) and then a horizontal, or highly deviated, section may be drilled to allow for exploration of the surrounding environment at that depth. A crawler 138 may be deployed in the borehole to collect data about the environment, as discussed further below.

Generally, absent some type of maintenance, the borehole 170 may have a tendency to collapse due to pressure from the surrounding rock formation. As shown in FIG. 11, pressure P1 from the rock formation exerts a force 176 on the walls of the borehole. To prevent the borehole from collapsing, the borehole may be filled (or partially filled) with a substance referred to in the oil industry as drilling mud 178. The drilling mud exerts a pressure P2 (illustrated by force lines 180) against the walls of the borehole, which is controlled through the volume and properties of the drilling mud to be greater than the pressure P1 from the surrounding rock formation. Thus, the drilling mud keeps the borehole open. However, as a consequence of filling the borehole with the drilling mud, the crawler 138 deployed in the borehole should preferably be capable of locomotion while submerged in the drilling mud.

Figure 12:
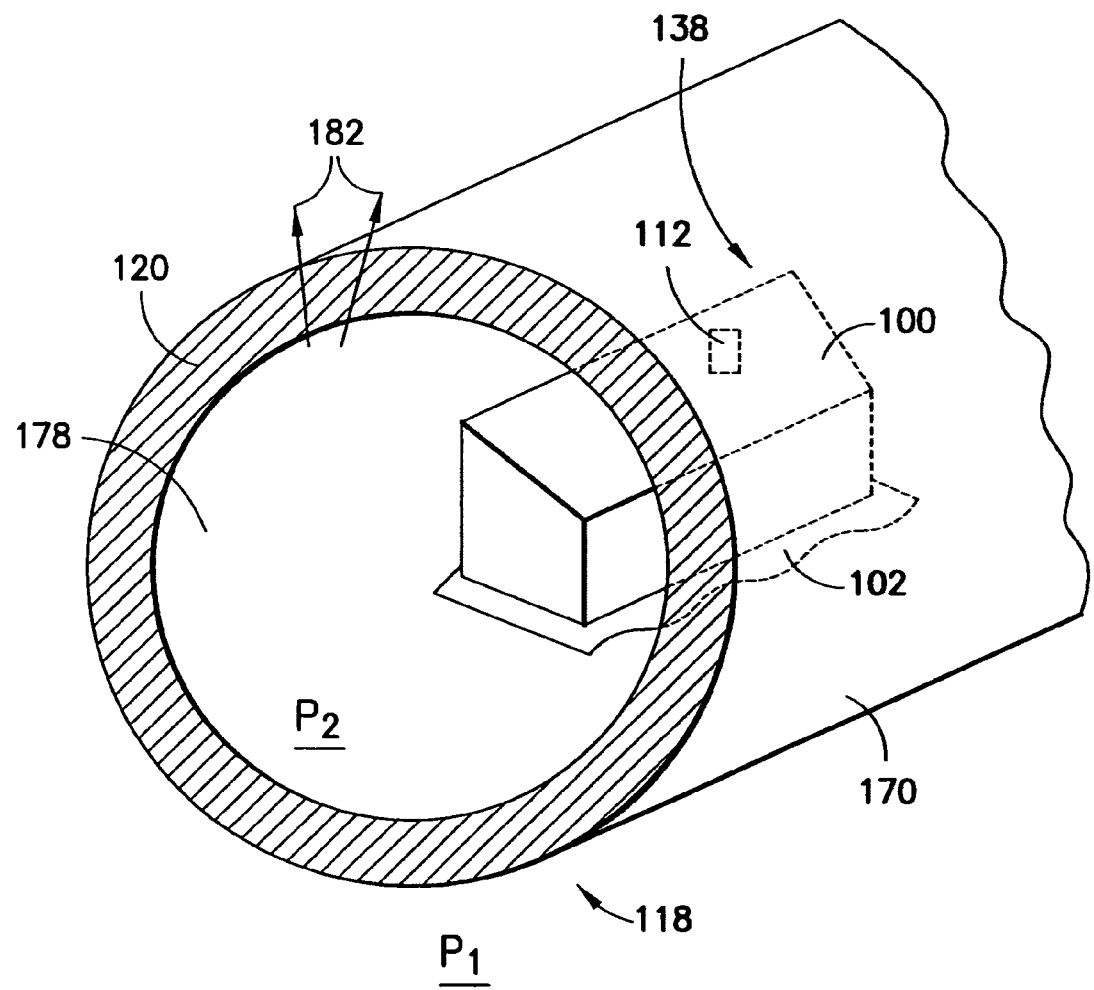
FIG. 12 is a diagram of a another embodiment of a crawler inside a hole.

Therefore, according to one embodiment illustrated in FIG. 12, the crawler 138 may be provided with a sealed body 100 that contains modules such as, for example, the wave generator, the wave transfer mechanism and the power transfer module. The foot 102 may be attached to the underside of the sealed body 100 and the wave transfer mechanism may be coupled to the foot through sealed openings in the body 100, using for example, O-rings or other seals that allow a coupling mechanism to protrude from the body to the foot, but prevent any fluid (or particles) from entering the body. Similarly, a sensor module 112 may be located outside the sealed body 100 and may communicate with internal modules (e.g., the controller 114) through control and/or data lines that may extend though sealed openings in the body. Alternatively, the sensors may be located inside the body and the body, or a portion thereof, may be made of a material that is transparent to sensing signals used by the sensors.

As discussed above, the drilling mud 178 in the hole may be at a pressure greater than that exerted by the rock formation so as to maintain the hole. Drilling mud is generally a composition that may include water, oil or another liquid. For example, drilling mud may be a water-based or oil-based mixture including a type of soil or sand. In one example of a water-based drilling mud, the mud may be formed of a mixture of clay (or other soil type) and water. In one specific example, the drilling mud may be a mixture of 50% clay and 50% water. The rock formation is generally at least slightly porous to liquids such as water or oil that make up part of the drilling mud mixture. Therefore, as a result of the pressure differential, some of the liquid may leach out of the drilling mud into the rock formation, as indicated by arrows 182 in FIG. 12, at the boundaries of the hole, i.e., along the surfaces of the hole. Thus, along the inner surface of the hole, a fluid is formed that contains less liquid than the remaining bulk of the drilling mud. This fluid, referred to as the "mudcake," may provide the tractoring fluid 120 for crawlers deployed in the hole. Therefore, as a natural consequence of the manner in which drilling holes may be generally maintained, crawlers according to various embodiments of the invention may be suited to the hole environment because the necessary tractoring fluid is naturally present in the hole. Of course it is to be appreciated that in other embodiments and circumstances, the drilling mud 178 may itself line the hole and may provide the tractoring fluid 120. Because the crawlers may be insensitive to characteristics of the tractoring fluid, the mudcake normally present in the hole acts as a suitable tractoring fluid and no special preparation of the holes is needed to allow the crawlers to traverse inside the holes. Particularly, crawlers may be used in holes filled with either water-based or oil-based drilling muds, as well as with other types of liquids of mixtures. In addition, crawlers according to aspects of the invention may move regardless of the fact that they may be submerged in the drilling mud, or in a different fluid. Accordingly, embodiments of the crawlers may also be suitable for locomotion in other submerged environments, for example, on the ocean floor, on river beds, etc.

As discussed above, embodiments of crawlers according to aspects of the invention may be equipped with a sensor module 112 (see FIG. 1) for collecting data about the surrounding environment and optionally for communicating with external devices. For example, in the context of oil and/or natural gas exploration, the sensors 112 may include temperature, pH, pressure and/or acoustic sensors for measuring parameters inside a hole. The crawler may also be equipped with a sensor and/or analytical module for measuring, for example, the chemical composition of the substrate at various locations along a hole. In one example, an analytical module forming part of the sensor module may be adapted to collect samples of material in the hole or the rock formation and to store these samples for analysis when the crawler is removed from the hole. It is to be appreciated that the invention is not limited to these examples of sensors, and many other types of sensors may be used to measure many different parameters of the environment in which the crawler is located. For example, the sensors may also include a vision sensor, such as a camera or light-detector, or infrared sensors, to collect visual data about the environment. In addition, the sensors may include an accelerometer to measure the actual speed of the crawler. This may be useful to measure, for example, displacement by integrating the acceleration over time, and any slippage of the crawler as it moves. As will be appreciated by those skilled in the art, many other types of sensors are also possible and the scope of the invention is not intended to be limited to the specific examples given herein.

Figure 13:
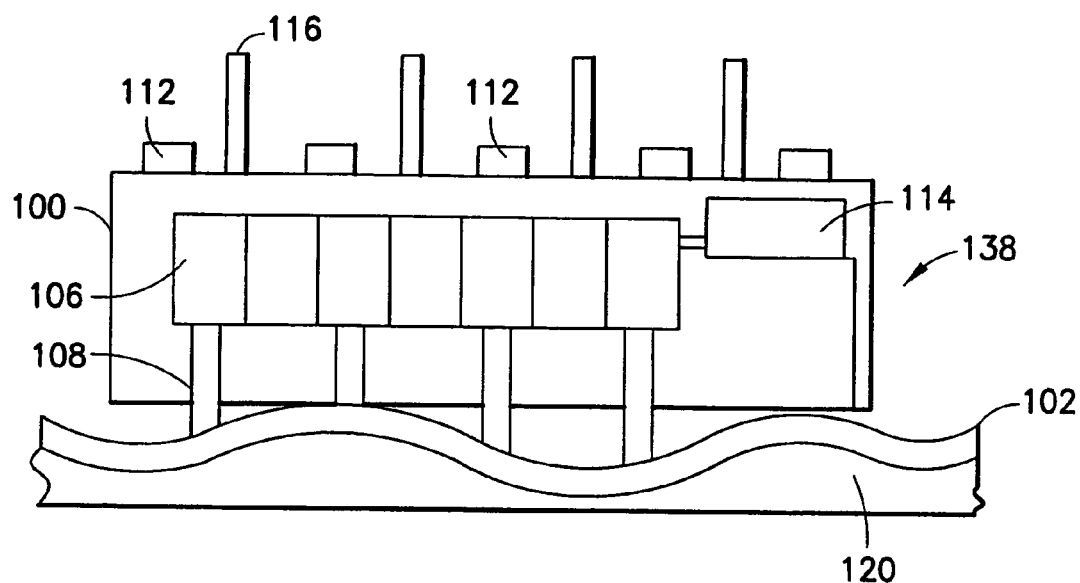
FIG. 13 is a diagram of another embodiment of a crawler according to aspects of the invention.

According to one embodiment, a crawler may include a controller 114 (see FIG. 1). This controller may be coupled to the sensors to, for example, receive and store data from the sensors. Referring to FIG. 13, there is illustrated one embodiment of a crawler including sensors 112 and a controller 114. In one example, the sensors may be adapted to collect data (e.g., temperature, pressure or chemical data) from the surrounding environment and provide that data to the controller for storage and/or processing. The sensor module 112 may also include distance and/or location sensors, such that other data collected by the sensors 112 may be correlated with the crawler's position inside a hole, for example. Similarly, a vision sensor (such as a camera) may also be used to determine the crawler's position. Alternatively, the controller 114 may be programmed to activate the sensors to collect data at predetermined intervals that may be correlated to the crawler's location based on, for example, the crawler's known velocity. Being equipped with such and other sensors, and having the ability to collect and record data about its environment may be particularly useful features of the crawler in many applications where it may be desirable to send a self-propelled instrument into, for example, a hostile or inaccessible environment. According to another embodiment, the sensors 112 may also include a "homing" capability. In other words, the sensors 112 may be able to receive a signal directing the crawler to backtrack (e.g., so that it can be removed from a hole) or to return to a particular location. In addition, the sensors (e.g., under the direction of the controller) may be able to transmit a signal to indicate a presence or location of the crawler. Thus, the sensors 112 may also provide the crawler with communication capability (e.g., using a radio transceiver) with, for example, a home base or other external entity.

Figure 14:
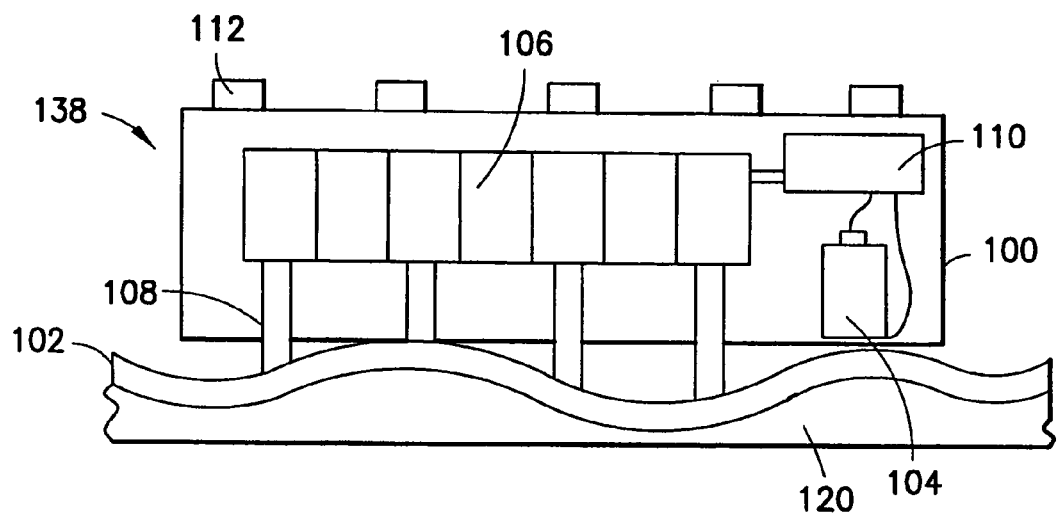
FIG. 14 is a diagram of another embodiment of a crawler including a self-contained power source, according to aspects of the invention.

As discussed in reference to FIG. 1, embodiments of a crawler may include a power module 104. In some embodiments, this power module may be contained in the body of the crawler (or coupled to the body of the crawler, but not necessarily located inside the body) such that the crawler is self-powered. For example, referring to FIG. 14, there is illustrated one embodiment of a crawler 138 including a power module 104. The power module 104 may be, for example, a battery that provides power to the various components of the crawler. In one example, the power module may power the wave generator (e.g., provide actuation power for actuators as described above in connection with one embodiment, or provide power to a motor to rotate a helix as described above in connection with another embodiment) and/or wave transfer mechanism. In other embodiments, the power module may also provide power for the sensors 112. In embodiments where the crawler includes a controller, the power module may supply power for the controller as well.

Figure 15:
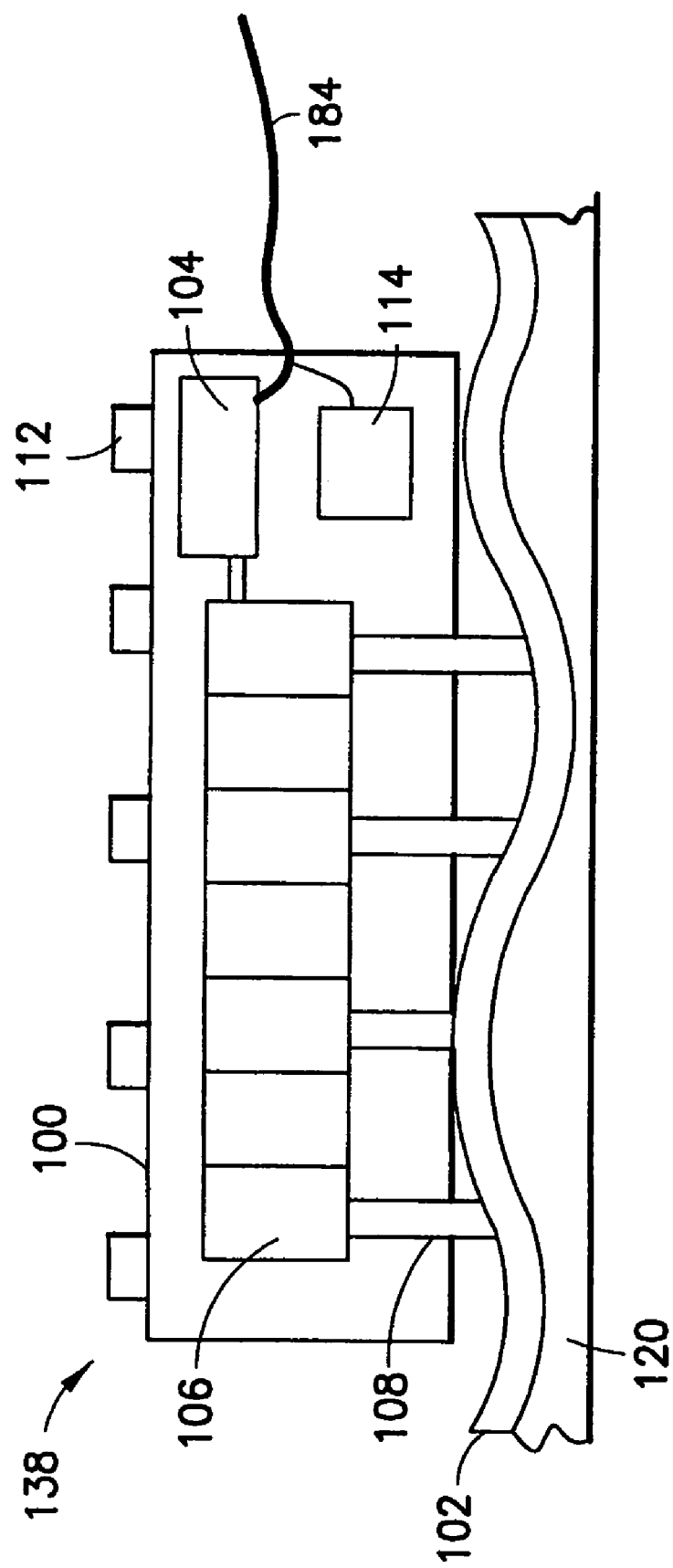
FIG. 15 is a diagram of another embodiment of a crawler according to aspects of the invention.

According to another embodiment, the crawler 138 may not include an on-board power module, but may instead receive power from an external source, as shown in FIG. 15. In some applications, it may be preferable to provide power to the crawler 138 via a cord 184. For example, it may be desirable in some applications to keep the crawler as light as possible, and may not be problematic to run the cord to the crawler. It is to be appreciated that such external power may be supplied to crawlers including any embodiments of the various other modules described herein, and may also be supplied to sealed crawlers. In that case, the body 100 may include an opening with a seal (such as an O-ring) to allow the cord in, but prevent fluid, particles or other matter from entering the crawler body.

In another embodiment, the cord 184 may be used not only for power, but also for data communication with the crawler. For example, as shown in FIG. 15, the controller 114 may also be coupled to the cord so as to be able to receive instructions from an external source and/or to transmit data to an external entity. Thus, the cord 184 may include power and/or data transmission media. In one example, the crawler may be able to transmit over the cord, data collected by the sensors. Thus, the crawler may not need a storage element for such data as it may be able to transmit the data directly to the external entity. However, it is to be appreciated that this is not necessarily the case and the crawler may include an on-board storage element in addition to be able to transmit data directly over the cord 184. As discussed with reference to other modules of the crawler, many different combinations of features are possible for different embodiments of crawlers and the invention is not limited to any specific arrangement or combination of features.

Referring again to FIG. 13, according to another embodiment, a crawler may include an energy harvesting module 116. In some applications, the crawler may be able to collect energy from its environment to supplement or replace the power module 104. For example, the energy harvesting module may include solar or photovoltaic cells that may produce power in response to light, thereby offering power (or additional or back-up power) to components of the crawler. In downhole applications, where light may not be available, the energy harvesting module may include, for example, hydraulic devices that may harvest energy from the flow of matter (e.g., flowing drilling mud) in the hole, thermal devices that may use thermal energy to produce power, and/or devices for harvesting chemical energy. The energy harvesting module may be used to power only some modules of the crawler, for example, the sensors, or may provide complete power for the crawler. Alternatively, the energy harvesting module may provide back-up power in the event the power module 104 fails, or the cord 184 (see FIG. 15) is severed or damaged.

As discussed above one environment in which crawlers according to aspects of the invention may be used includes holes, such as oil exploration boreholes. It is common that such holes do not have a uniform inner diameter due to, for example, the shape of the tools used to drill the holes and non-uniformities in the rock formation in which the holes are drilled. Thus, it may be useful for a crawler to be able to adapt to varying hole diameters and topologies. As discussed above, the crawlers may overcome many variations in the substrate over which they are moving because they may move over both horizontal and inclined surface and may be insensitive to the composition of the substrate. In addition, the foot of the crawler may easily adapt to varying surface topologies because the foot may be formed of a flexible cloth, plastic or other material. For example, in one embodiment, the foot may be a foamed rubber or other material that may easily accommodate bumps or other variations in the substrate. It may be advantageous that embodiments of the crawler may not need to be optimized for specific topologies or substrates. However, it is to be appreciated that some embodiments of crawlers may be optimized for other parameters, such as a known type of tractoring fluid, wave shape, wave periodicity, etc., as discussed further below.

Figure 16:
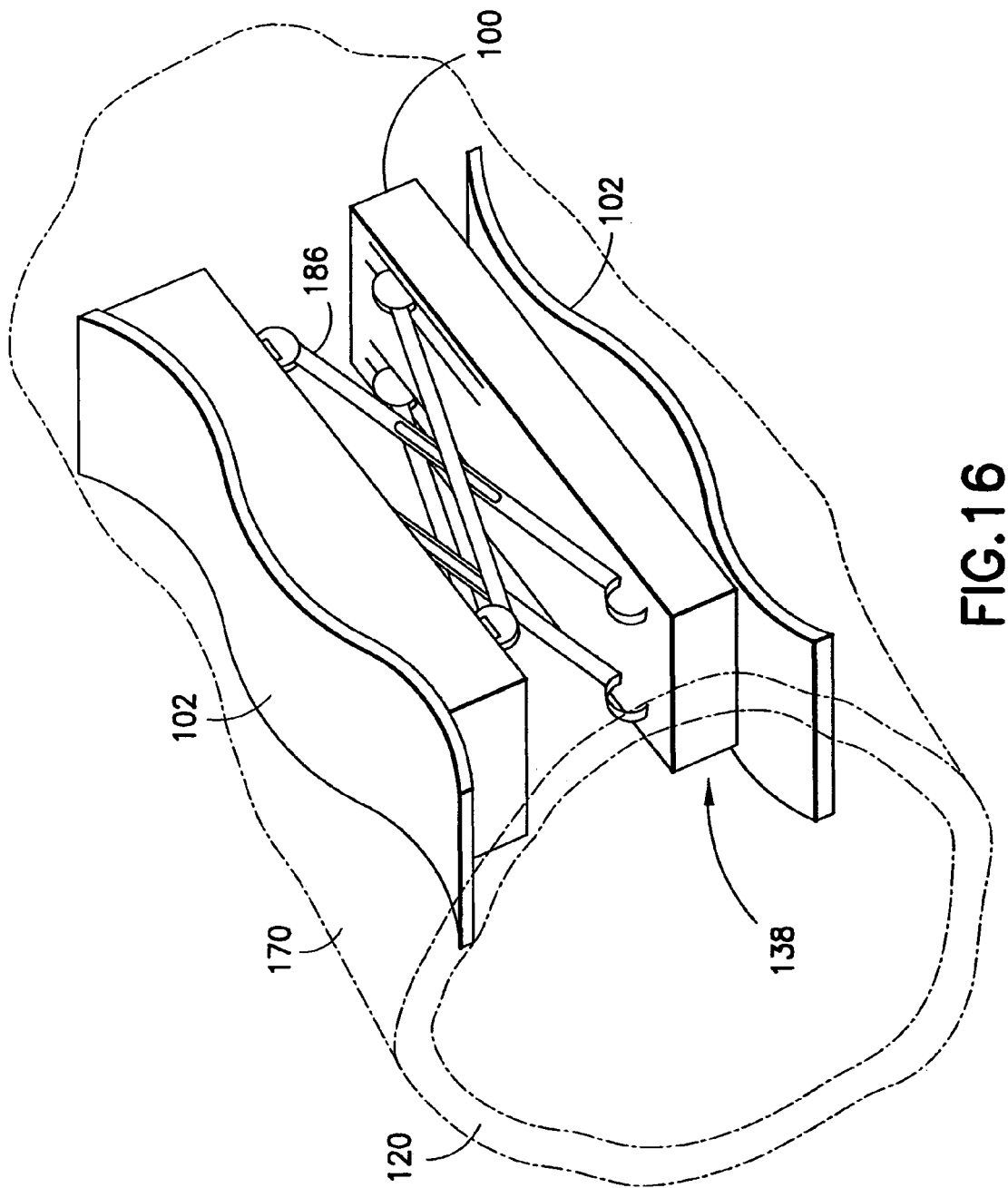
FIG. 16 is a diagram of another embodiment of a crawler including a normal-force providing mechanism according to aspects of the invention.

To further aid a crawler in moving through a hole, one embodiment of a crawler may include means for providing a normal force to assist the crawler in climbing inclined substrates or traversing vertical, or near vertical substrates or overhangs. For the purposes of this disclosure, a "normal force" is defined as a force that acts in a direction approximately 90 degrees to the plane of the foot. In other words, when the crawler is on a horizontal surface, a normal force acting on the foot is gravity. Referring to FIG. 16, in one example, a crawler may include an arm mechanism 186 capable of pressing the foot 102 of the crawler 138 against the substrate and capable of adapting to varying hole diameters. In the illustrated embodiment, the crawler 138 includes two split body portions 100 with an arm mechanism 186 joining the two portions of the body 100. In this example, the crawler may include two feet 102 such that the arm mechanism 186 may press the feet against opposite sides of the hole 170. The arm mechanism may provide a normal force to allow the crawler to traverse along any surface of the hole, including a near vertical wall of the hole or a top surface or overhanging portion of the hole. According to one embodiment, the arm mechanism may be similar to that described in International Patent Application No. WO2005/008023 A1, which is herein incorporated by reference. However, it is to be appreciated that other arm mechanisms and other designs for providing a normal force in the foot of the crawler are also possible.

Various embodiments of crawlers discussed herein may be used to convey items, for example, in a borehole, pipe or other environment. In one example, the crawler may convey an item such as a tool or sensor to be used in the hole (or other environment). As discussed above, the sensor module may comprise an analytical module that may collect a sample from the crawler's environment. Thus, the crawler may be adapted to convey the sample back to a desired location. In addition, the crawler may be coupled to a wire, cable or other line and may be used to draw the line though, for example, a hole or pipe.

Figure 17:
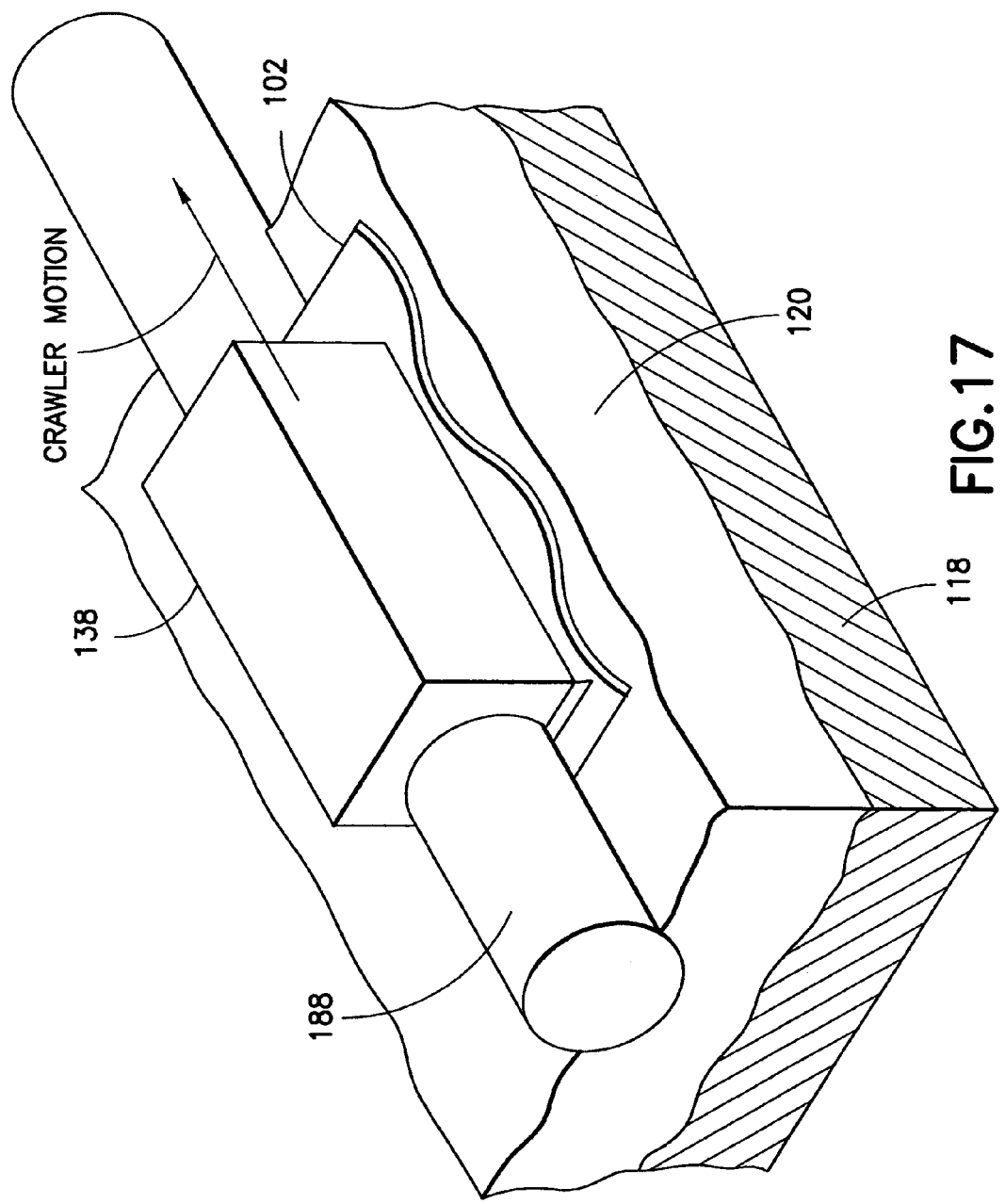
FIG. 17 is a perspective view of another embodiment of a crawler attached to a cable, according to aspects of the invention.

Referring to FIG. 17, there is illustrated another embodiment of a crawler according to aspects of the invention. As discussed above, embodiments of crawlers according to aspects of the invention may be used in downhole applications (e.g., for oil or natural gas applications) in which the crawler traverses a hole filled with drilling mud. In some of these applications, a cable 188 may be fed through the hole to deploy instruments, provide power to downhole instruments, and for many other uses. As discussed above, the differential pressures between the interior of the mud-filled hole and the external rock formation can causes a net force (see FIG. 12) that can cause liquid in the drilling mud to leach into the surrounding rock formation. This force may similarly cause the cable 188 to be sucked into the mud, where it may become stuck, a phenomenon called "differential sticking." This may be highly undesirable in many circumstances. Accordingly, to alleviate this problem of differential sticking, a crawler 138 may be attached to the cable 188, as shown. When the cable 188 becomes stuck, the crawler 138 may be activated (e.g., by a signal provided to controller 114) and may begin to move in the manner described above. This movement of the crawler may provide sufficient force to free the cable from the mud, overcoming the problem of differential sticking. In the illustrated example, the crawler body may be designed so as to accommodate the cable 188, as shown. However, it is to be appreciated that many other configurations of the crawler are also capable of attaching the crawler to the cable and providing the functionality of being able to move a portion of the cable. In addition, the activation signal may be supplied from a number of sources. In one example, the cable 188 may carry electrical power to activate the crawler. Activation may also be caused by a signal received, for example, from a remote source (e.g., an above-ground source that realizes the cable has become stuck) or from the crawler itself (e.g., generated in response to data received by the crawler's sensors).

As discussed above, the crawler may be adaptable to many different substrates and need not be optimized for particular substrate topologies. Rather, as shown by the equations above, the motion of the crawler may be dependent on the driving wave shape, the driving wave speed (which may be defined by the wavelength of the driving wave) and some parameters of the tractoring fluid. Therefore, embodiments of the crawler may be optimized for any of these parameters, as well as for known conditions and materials, so as to optimize or improve performance, velocity and efficiency. In particular, according to some embodiments, the crawler may be optimized for tractoring force and/or power given a known environment, i.e., a known tractoring fluid. For example, for a crawler used inside a borehole, it can be known that the tractoring fluid is the mudcake, as described above. For a given drilling mud, the properties of the resulting mudcake may be known, and thus the crawler may be optimized for this tractoring fluid. The shape of the foot may also be optimized to account for known conditions. In addition, as shown by the above equations, the velocity of the crawler is dependant upon the wave shape of the driving wave and also the speed of the driving wave (which may be defined by the wavelength of the driving wave). Therefore, performance of the crawler the wave shape can be altered to optimize velocity and/or efficiency. For example, for some applications, the driving wave may have a sawtooth or square-wave shape, rather than a sinusoidal shape.

Having thus described several aspects of at least one embodiment of this invention, it is to be appreciated various alterations, modifications, and improvements will readily occur to those skilled in the art. For example, embodiments of crawlers may comprise many different combinations of the modules and components described herein and the invention is not limited to the particular arrangements and combinations illustrated in the figures. Crawlers with or without sensors, or including any of the wave generation modules described herein may be internally powered or may receive power from an external source. Similarly, crawlers may include sealed bodies containing any of the various modules and embodiments thereof described herein, and such sealed crawlers may also be internally powered or may receive power from an external source. In addition, crawlers comprising any embodiment of any module described herein may be able to transmit and/or receive data, or may be equipped with an internal storage element and/or controller. Thus, many variations of crawlers are envisioned comprising various embodiments of some or all of the modules described herein. Furthermore, crawlers according to aspects of the invention may be used in many applications and are not limited to use in the oil and/or natural gas industry. For example, crawlers may be used to traverse ductwork in buildings, in excavation sites, to map parameters on ocean, sea or river beds, and many other applications. Such and other alterations, modifications, and improvements are intended to be part of this disclosure, and are intended to be within the spirit and scope of the invention. Accordingly, the foregoing description and drawings are by way of example only.

What is claimed is:

1. A self-propelled mechanical crawler adapted to move on a medium, the crawler comprising:
   a foot;
   a wave generator adapted to drive a periodic wave in the foot;
   a wave transfer mechanism comprising a plurality of members adapted to move in a perpendicular direction to the foot coupled between the wave generator and the foot and adapted to translate the periodic wave produced by the wave generator into a corresponding periodic deformation in the foot so as to generate forces in the medium to propel the crawler forward.

2. The self-propelled crawler of claim 1, wherein the wave generator comprises a rotatable helix.

3. The self-propelled mechanical crawler of claim 1, wherein the wave transfer mechanism comprises a plurality of sheets coupled to the rotatable helix and to the foot and constructed and arranged to move in a vertical direction in response to rotation of the helix so as to produce the periodic deformation in the foot.

4. The self-propelled mechanical crawler of claim 1, wherein the wave transfer mechanism comprises a compliant mechanism.

5. The self-propelled mechanical crawler of claim 1, further comprising a power module adapted to provide operating power to the wave generator.

6. The self-propelled mechanical crawler of claim 1, further comprising a controller coupled to the wave generator and adapted to control at least one of a shape and wavelength of the periodic wave generated by the wave generator.

7. The self-propelled mechanical crawler of claim 6, wherein the wave generator comprises a plurality of actuators coupled to the controller; wherein the wave transfer mechanism comprises a corresponding plurality of attachment devices coupling each of the plurality of actuators to the foot; and
   wherein the controller is adapted to provide an actuation signal to the plurality of actuators to control movement of the plurality of attachment devices to drive the periodic wave in the foot.

8. The self-propelled mechanical crawler of claim 1, further comprising at least one sensor adapted to provide data representing at least one parameter of an environment of the crawler.

9. The self-propelled mechanical crawler of claim 8, wherein the at least one parameter includes at least one of temperature, pressure, pH and chemical composition.

10. The self-propelled mechanical crawler of claim 8, wherein the at least one sensor comprises an analytical module adapted to collect a sample from the environment of the crawler.

11. The self-propelled mechanical crawler of claim 8, further comprising a controller coupled to the sensor and adapted to receive the data from the at least one sensor and to store the data.

12. The self-propelled mechanical crawler of claim 1, further comprising an energy harvesting module adapted to derive power from a surrounding environment of the crawler and to provide operating power for at least one component of the crawler.

13. The self-propelled mechanical crawler of claim 1, wherein the periodic wave comprises a sinusoid.

14. The self-propelled mechanical crawler of claim 1, adapted to traverse a borehole, wherein the medium comprises a tractoring fluid lining an interior surface of the borehole.

15. The self-propelled mechanical crawler of claim 1, wherein the medium comprises one of a floor of a body of water, a pipe, a building duct, and a borehole.

16. A method of producing locomotion in a mechanical crawler, the method comprising acts of:
 generating a periodic wave within the mechanical crawler;
 the periodic wave moving a plurality of members in a perpendicular direction to the foot:
 the plurality of members driving the periodic wave in a foot of the crawler;
 wherein the driving act generates,
 forces in the foot and in a surface over which locomotion is to be produced, the forces producing the locomotion.

17. The method of claim 16, wherein the act of generating the periodic wave includes generating a sinusoidal wave.

18. The method of claim 16, further comprising an act of controlling at least one of a shape and wavelength of the periodic wave.

19. The method of claim 16, wherein the act of driving the periodic wave in the foot includes controlling motion of portions of the foot to produce the periodic wave in the foot.

20. The method of claim 16, further comprising acts of sensing at least one parameter of an environment of the mechanical crawler and providing data representing the at least one parameter.

21. The method of claim 16, further comprising an act of harvesting energy from an environment of the mechanical crawler to providing operating power for at least one component of the mechanical crawler.

22. A self-propelled mechanical crawler comprising:
 a foot in contact with a tractoring fluid;
 means for generating a periodic wave; and
 means for coupling the periodic wave to the foot the coupling means comprising a plurality of members adapted to move in a perpendicular direction to the foot to produce locomotion of the self-propelled mechanical crawler.

23. The self-propelled mechanical crawler of claim 22, further comprising means for producing a normal force in the foot.

24. The self-propelled mechanical crawler of claim 22, further comprising a sensor module adapted to provide data representative of at least one parameter of one of the crawler and an environment of the crawler.

25. A crawler adapted to traverse a substrate comprising a layer of tractoring fluid disposed over a surface of the substrate, the crawler comprising:
 a sealed body;
 a foot coupled to an exterior surface of the sealed body;
 a wave generator disposed within the sealed body and adapted to drive a periodic wave in the foot;
 a wave transfer mechanism comprising a plurality of members adapted to move in a perpendicular direction to the foot coupled to the wave generator and to the foot, and adapted to deform the foot in accordance with a shape of the periodic wave so as to generate forces in the tractoring fluid to propel the crawler over the substrate.

26. The crawler of claim 25, adapted to traverse a borehole, wherein the tractoring fluid comprises drilling mud.

27. The crawler of claim 25, wherein the substrate includes a floor of a body of water.

28. The crawler of claim 25, wherein the substrate includes a pipe.

29. The crawler of claim 25, wherein the sealed body, the foot, the wave generator and the wave transfer mechanism are within a housing made of a flexible material.

30. A method of conveying an item in a borehole, the method comprising acts of:
 providing a downhole crawler comprising a foot, a wave generator adapted to drive a periodic wave in the foot, and a wave transfer mechanism comprising a plurality of members adapted to move in a perpendicular direction to the foot coupled between the wave generator and the foot and adapted to translate the periodic wave produced by the wave generator into a corresponding periodic deformation in the foot so as to generate forces to propel the crawler;
 coupling the item to the downhole crawler; and
 activating the crawler so as to move the crawler in the borehole.

31. The method of claim 30, wherein the item comprises a cable.

* * * * *

UNITED STATES PATENT AND TRADEMARK OFFICE
CERTIFICATE OF CORRECTION

PATENT NO. : 7,617,891 B2
APPLICATION NO. : 11/247918
DATED : November 17, 2009
INVENTOR(S) : Brian Chan Page 1 of 1

It is certified that error appears in the above-identified patent and that said Letters Patent is hereby corrected as shown below:

Please delete the paragraph titled 'STATEMENT REGARDING FEDERALLY SPONSORED RESEARCH OR DEVELOPMENT' encompassing column 1, lines 6-9:

"This invention was made with government support awarded by the National Science Foundation under Grant Number DMS-0243591. The government has a certain rights in this invention."

and replace with:

--This invention was made with government support under Grant No. DMS0243591 awarded by the National Science Foundation. The government has certain rights in this invention.--

Signed and Sealed this
Thirteenth Day of November, 2012

David J. Kappos
*Director of the United States Patent and Trademark Office*